United States Patent
Van Nee

(10) Patent No.: US 9,112,737 B2
(45) Date of Patent: Aug. 18, 2015

(54) SYSTEMS AND METHODS FOR DETERMINING A CHANNEL VARIATION METRIC

(71) Applicant: QUALCOMM Incorporated, San Diego, CA (US)

(72) Inventor: Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 13/787,041

(22) Filed: Mar. 6, 2013

(65) Prior Publication Data

US 2014/0254648 A1    Sep. 11, 2014

(51) Int. Cl.
*H04L 25/02* (2006.01)
*H04B 7/04* (2006.01)
*H04B 7/06* (2006.01)

(52) U.S. Cl.
CPC .......... *H04L 25/0222* (2013.01); *H04B 7/0413* (2013.01); *H04B 7/0645* (2013.01); *H04B 7/0686* (2013.01)

(58) Field of Classification Search
CPC ...................................................... H04L 25/02
USPC ................................................. 375/224, 346
See application file for complete search history.

(56) References Cited

U.S. PATENT DOCUMENTS

| | | | |
|---|---|---|---|
| 6,754,475 B1* | 6/2004 | Harrison et al. | 455/115.1 |
| 8,213,527 B2* | 7/2012 | Wang et al. | 375/267 |
| 8,300,572 B2 | 10/2012 | Roh et al. | |
| 2005/0135324 A1* | 6/2005 | Kim et al. | 370/343 |
| 2006/0104340 A1 | 5/2006 | Walton et al. | |
| 2010/0172316 A1* | 7/2010 | Hwang et al. | 370/330 |
| 2010/0215108 A1* | 8/2010 | Balachandran et al. | 375/260 |
| 2011/0122971 A1* | 5/2011 | Kim et al. | 375/316 |
| 2011/0171964 A1* | 7/2011 | Lin et al. | 455/450 |
| 2011/0199946 A1 | 8/2011 | Breit et al. | |
| 2011/0319027 A1 | 12/2011 | Sayana et al. | |

FOREIGN PATENT DOCUMENTS

WO    WO-2012060751 A1    5/2012

OTHER PUBLICATIONS

International Search Report and Written Opinion—PCT/US2014/018697—ISA/EPO—May 14, 2014.

* cited by examiner

*Primary Examiner* — Jaison Joseph
(74) *Attorney, Agent, or Firm* — Knobbe Martens Olson & Bear, LLP

(57) ABSTRACT

A method for determining a channel variation metric by an electronic device is described. The method includes receiving a first packet. The method also includes receiving a second packet. The method further includes determining a channel variation metric that approximates a mean square error value based on a first channel estimate corresponding to a first packet and a second channel estimate corresponding to a second packet. The method additionally includes performing an operation based on the channel variation metric.

36 Claims, 11 Drawing Sheets

SYSTEMS AND METHODS FOR DETERMINING A CHANNEL VARIATION METRIC

TECHNICAL FIELD

The present disclosure relates generally to communication systems. More specifically, the present disclosure relates to computing a channel variation metric.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

Use of communication devices has dramatically increased over the past few years. Communication devices often provide access to a network, such as a local area network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., wireless fidelity or "Wi-Fi") standards. Communication device users, for example, often connect to wireless networks using such communication devices.

As the use of communication devices has increased, advancements in communication device capacity, reliability and efficiency are being sought. Systems and methods that improve communication device capacity, reliability and/or efficiency may be beneficial.

SUMMARY

A method for determining a channel variation metric by an electronic device is described. The method includes receiving a first packet. The method also includes receiving a second packet. The method further includes determining a channel variation metric that approximates a mean square error value based on a first channel estimate corresponding to a first packet and a second channel estimate corresponding to a second packet. The method additionally includes performing an operation based on the channel variation metric.

The channel variation metric may be insensitive to gain variation and phase variation. Performing the operation may include switching between at least two of an open loop mode, a single-user multiple input and multiple output (SU-MIMO) mode and a multi-user multiple input and multiple output (MU-MIMO) mode.

Performing the operation may include requesting feedback. Requesting feedback may occur when the channel variation metric is less than a threshold. Performing the operation may include sending a multi-user multiple input and multiple output (MU-MIMO) packet without requesting feedback. Performing the operation may include determining a maximum time between feedback requests for at least one of multi-user multiple input and multiple output (MU-MIMO) and single-user multiple input and multiple output (SU-MIMO).

Determining the channel variation metric may include determining absolute values of channel measurements corresponding to the first packet and to the second packet, determining a mean amplitude per antenna, determining normalized values based on the mean amplitude per antenna, and subtracting the normalized values. Determining the channel variation metric may be based on a subset of tones.

A communication device for determining a channel variation metric is also described. The communication device includes receiver circuitry that receives a first packet and receives a second packet. The communication device also includes channel variation metric computation circuitry coupled to the receiver circuitry. The channel variation metric computation circuitry determines a channel variation metric that approximates a mean square error value based on a first channel estimate corresponding to a first packet and a second channel estimate corresponding to a second packet. The communication device further includes operations circuitry coupled to the channel variation metric computation circuitry. The operations circuitry performs an operation based on the channel variation metric.

A computer-program product for determining a channel variation metric is also described. The computer-program product includes a non-transitory tangible computer-readable medium with instructions. The instructions include code for causing a communication device to receive a first packet. The instructions also include code for causing the communication device to receive a second packet. The instructions further include code for causing the communication device to determine a channel variation metric that approximates a mean square error value based on a first channel estimate corresponding to a first packet and a second channel estimate corresponding to a second packet. The instructions additionally include code for causing the communication device to perform an operation based on the channel variation metric.

An apparatus for determining a channel variation metric is also described. The apparatus includes means for receiving a first packet. The apparatus also includes means for receiving a second packet. The apparatus further includes means for determining a channel variation metric that approximates a mean square error value based on a first channel estimate corresponding to a first packet and a second channel estimate corresponding to a second packet. The apparatus additionally includes means for performing an operation based on the channel variation metric.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
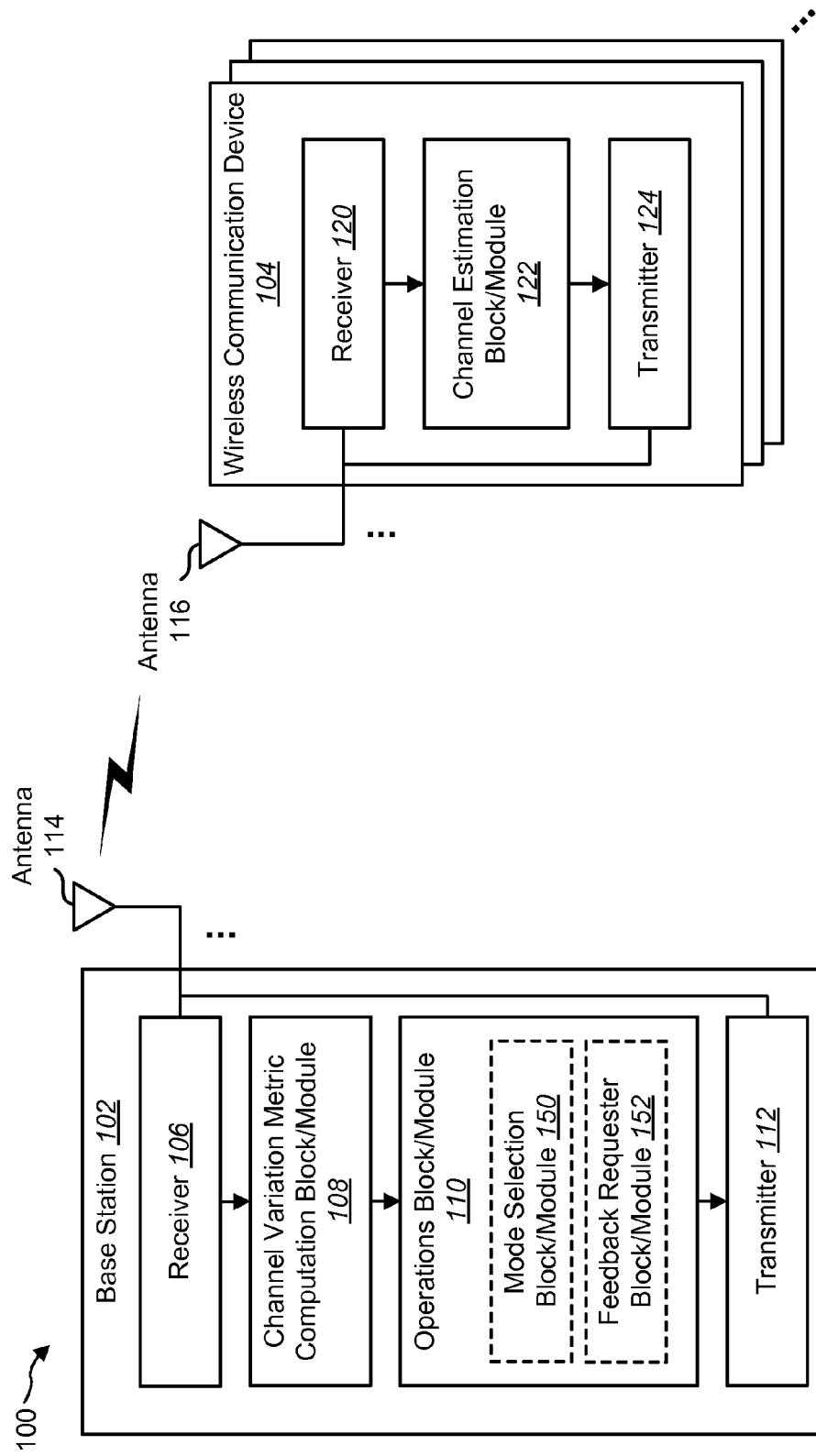
FIG. 1 is a block diagram illustrating one configuration of a wireless communication system for determining a channel variation metric.

FIG. 1 is a block diagram illustrating one configuration of a wireless communication system 100 for determining a channel variation metric. The wireless communication system 100 may include a base station 102 and one or more wireless communication devices 104. The base station 102 may determine a channel variation metric. The channel variation metric may be used by the base station 102 to perform an operation, such as switching between modes or requesting additional feedback information.

Examples of base stations 102 include cellular telephone nodes, access points, wireless gateways and wireless routers. A base station 102 may operate in accordance with certain industry standards, such as the IEEE 802.11a, 802.11b, 802.11g, 802.11n and/or 802.11ac (e.g., wireless fidelity or "Wi-Fi") standards. Other examples of standards that a base station 102 may comply with include IEEE 802.16 (e.g., worldwide interoperability for microwave access or "WiMAX"), third generation partnership project (3GPP), 3GPP long term evolution (LTE) and others (e.g., where a base station 102 may be referred to as a Node B, evolved Node B (eNB), etc.). While some of the systems and methods disclosed herein may be described in terms of one or more standards, this should not limit the scope of the disclosure, as the systems and methods may be applicable to many systems and/or standards.

Examples of wireless communication devices 104 may include access terminals, client devices, client stations, etc., and may wirelessly communicate with other communication devices (e.g., base stations 102 and wireless communication devices 104). Some wireless communication devices 104 may be referred to as stations (STAs), mobile devices, mobile stations, subscriber stations, user equipments (UEs), remote stations, access terminals, mobile terminals, terminals, user terminals, subscriber units, etc. Additional examples of wireless communication devices 104 include laptop or desktop computers, cellular phones, smart phones, wireless modems, e-readers, tablet devices, gaming systems, etc. Some of these wireless communication devices 104 may operate in accordance with one or more industry standards as described above.

The general term "communication device" (e.g., base stations 102 and wireless communication devices 104) may include communication devices described with varying nomenclatures according to industry standards (e.g., access terminal, UE, remote terminal, access point, base station, Node B, evolved Node B (eNB), etc.). Some communication devices may be capable of providing access to a communications network. Examples of communications networks include, but are not limited to, a telephone network (e.g., a "land-line" network such as the public-switched telephone network (PSTN) or cellular phone network), the internet, a local area network (LAN), a wide area network (WAN), a metropolitan area network (MAN), etc. For example, the wireless communication system 100 (e.g., network) may be a network that supports 802.11ac.

802.11ac is a new and faster version of 802.11 that is being standardized by the IEEE 802.11 group. 802.11ac in some instances may also be referred to as VHT (very high throughput). 802.11ac allows communication devices to employ high-throughput via a wireless local area network on the 5 GHz band. One method for achieving high-throughput is by employing additional signal bandwidth. For example, under 802.11ac, a communication device may transmit and receive transmissions using 80 megahertz (MHz) and/or 160 MHz. 802.11ac may also allow for additional multiple-input and multiple-output (MIMO) spatial streams. For instance, a base station 102 employing 802.11ac may employ eight spatial streams simultaneously to communicate with one or more wireless communication devices 104.

A base station 102 using 802.11ac may operate under various modes. Such modes include open-loop mode, single-user MIMO (SU-MIMO) and multi-user MIMO (MU-MIMO). In open-loop mode, the base station 102 does not receive feedback from wireless communication devices 104. Each wireless communication device 104 in the wireless communication system 100 must negotiate the one or more streams of received information from the base station. When the base station 102 is employing MIMO, open-loop mode may result in interference between different transmitted streams. This may be because the base station 102 has no knowledge of the channel conditions of the wireless communication devices 104.

In SU-MIMO, the base station 102 employs MIMO with a single wireless communication device 104. In MU-MIMO, the base station 102 may employ MIMO with one or more wireless communication devices 104 simultaneously.

When in SU-MIMO mode or MU-MIMO mode, the base station 102 may employ beamforming to communicate with one or more wireless communication devices 104. Beamforming, also referred to as antenna array signal processing, allows the base station 102 to transmit signals in a desired direction. In addition, beamforming reduces interference in a wireless communication system 100. For example, a base station 102 that knows the location of a desired wireless communication device may employ beamforming to transmit information to only the desired wireless communication device and not to other wireless communication devices located elsewhere in the wireless communication system 100. Accordingly, the base station 102 may avoid jamming the wireless communication system 100 channels by not transmitting irrelevant information to every wireless communication device, but only to the desired wireless communication device.

Channel measurements show that a channel generally exhibits two states. In a slow Doppler state, the same feedback may be utilized for tens of milliseconds (ms). A fast Doppler state may be caused by movements of the wireless communication device 104 (e.g., client) or by nearby moving people or objects. A channel variation metric (e.g., a channel Doppler metric) as described herein, may be utilized in one or more applications. In one example, the channel variation metric may be used to detect whether new feedback needs to be requested. In some configurations, new feedback may be requested if the channel variation metric is less than a threshold. The channel variation metric may be estimated based on uplink acknowledgements (ACKs), for instance. In another example, the channel variation metric may be used to determine a maximum time between feedback requests for both multi-user and single-user beamforming. Without wireless communication device 104 (e.g., client) movements, these maximum times may be around 20 ms for multi-user beamforming and 200 ms for single-user beamforming. More detail is given as follows.

A wireless communication device 104 may indicate its location and current state to the base station 102 via feedback, such as a channel report. The base station 102 may use the channel report feedback to determine channel measurements. A channel report may allow a base station 102 to determine if the wireless communication device 104 is in a slow Doppler state or a fast Doppler state. The location wireless communication device 104 may be fairly constant in a slow Doppler state. In this state, the base station 102 may employ the same channel report for tens of milliseconds (ms). For example, the same feedback may be used for tens of ms.

If in a fast Doppler state, the wireless communication device 104 may be moving rapidly between locations. For example, a channel report from the wireless communication device 104 may be outdated as to the location and the channel state within tens of ms. The fast Doppler state may be caused by movements of the wireless communication device 104 or by nearby moving people or objects.

While a wireless communication device 104 is in a slow Doppler state, the base station may effectively employ MU-MIMO. However, if the wireless communication device 104 is in a fast Doppler state, the base station may more effectively employ SU-MIMO. MU-MIMO may not be as effective as SU-MIMO when the wireless communication device 104 is in a fast Doppler state because MU-MIMO transmission may be sensitive to channel variation and may degrade when the wireless communication device 104 enters into a fast Doppler state. In other words, a wireless communication device 104 that is in a fast Doppler state may report large channel variations as the wireless communication device 104 moves between locations.

While in a fast Doppler state, the base station 102 may request additional feedback from the wireless communication device 104. For example, the base station 102 may request that feedback from the wireless communication device 104 be sent more frequently. In other words, the base station 102 may reduce the maximum time allowed between channel reports submitted by the wireless communication device 104. For instance, the base station 102 may request feedback from the wireless communication device 104 at least every 20 ms when the base station 102 is employing MU-MIMO and at least every 200 ms when the base station 102 is employing SU-MIMO. These maximum times (e.g., 20 ms for MU-MIMO and 200 ms for SU-MIMO) may be set for when the wireless communication device has little or no movement, for example. Determining the feedback frequency may also be based on if information in the feedback is above or below a certain threshold. For example, the base station 102 may request new feedback if a mean square error (MSE) value is below a threshold. For instance, the MSE may be estimated from an uplink acknowledgement (ACK) packet.

With the introduction of beamforming for SU-MIMO mode and MU-MIMO mode in 802.11ac, there may be a need for the base station 102 to know the amount of channel variation in order to determine whether the wireless communication device 104 may be better suited for SU-MIMO beamforming, MU-MIMO beamforming or neither. It may also be beneficial for the base station 102 to know how much variation there is in the channel in order to support rate adaptation.

Under known approaches, the base station 102 determines rate adaptation based on packet errors, which may be used to imply channel variation. However, packet errors may be caused by a number of different causes, so it may be a very indirect measure of channel variation. Furthermore, rate adaptation based on packet errors may be a relatively slow procedure (in comparison to determining a channel variation metric in accordance with the systems and methods disclosed herein).

Accordingly, the systems and methods disclosed herein describe determining a channel variation metric. For example, the channel variation metric may be a channel Doppler metric for estimating channel variation (in 802.11ac beamforming links, for example). The channel variation metric may also include information corresponding to the channel state of the wireless communication device 104, such as a slow Doppler state and a fast Doppler state.

The systems and methods disclosed herein provide approaches for estimation of channel variation that may be insensitive to amplitude gain and/or timing changes (e.g., phase variation). For example, the base station 102 may accurately determine a channel variation metric based on any two channels that were received at two different instances in time from the same wireless communication device 104. In some configurations, the majority of the channel variation metric processing may be performed in the PHY (physical layer) of the base station 102, allowing the final channel variation calculation to be done in software (e.g., media access control layer (MAC)) based on any two channels that were received at two different instances in time from the same wireless communication device 104.

The wireless communication device 104 may include a receiver 120, a channel estimation block/module 122 and a transmitter 124. It should be noted that one or more of the elements 120, 122, 124 included in the wireless communication device 104 may be implemented in hardware (e.g., circuitry), software or a combination of both. Furthermore, the term "block/module" may indicate that a particular element may be implemented in hardware, software or a combination of both. It should also be noted that although some of the elements 120, 122 and 124 may be illustrated as a single block, multiple blocks/modules may be employed in some configurations. For example, multiple antennas may be employed during MIMO communications.

The wireless communication device 104 may also include an antenna 116. One antenna 116 is shown for the sake of simplicity. In addition, the wireless communication device 104 may include multiple antennas that each receive and transmit signals. For example, multiple antennas 116 may be employed during MIMO communications.

The receiver 120 on the wireless communication device 104 may receive communications sent from the base station 102. For example, the base station 102 may send data, requests, queries, polls, pilot signals, training signals, etc., to the wireless communication device 104. The receiver 120 may be coupled to the channel estimation block/module 122 and may forward requests, queries, polls, pilot signals, training signals, etc., to the channel estimation block/module 122.

The wireless communication device 104 may also receive feedback requests from the base station 102. The feedback requests may request the wireless communication device 104 to increase or decrease the frequency (e.g., maximum time between channel reports) that the wireless communication device 104 sends channel reports to the base station 102. The base station 102 may request the wireless communication device 104 to increase the frequency of the channel reports to once at least every 20 ms when the wireless communication device 104 is in a fast Doppler state, for example.

The channel estimation block/module 122 may perform channel estimations to determine channel estimates and measurements. For example, the channel estimation block/module 122 may estimate the communication channel (e.g., phase, frequency, amplitude, etc.) at the wireless communication device 104. The channel estimation block/module 122 may include the estimates and measurements as feedback in a channel report.

In MIMO, the wireless communication device 104 may determine channel estimations corresponding to each stream of data received. For example, if the wireless communication device 104 is receiving data from four antennas on the base station 102, then the wireless communication device 104 may determine estimates for each antenna (e.g., channel or stream). Within each channel estimate, the wireless communication device 104 may determine estimations for one or more tones.

The transmitter 124 may be coupled to the channel estimation block/module 122 and may transmit feedback to the base station 102. For example, the transmitter 124 may transmit that feedback may be generated by the channel estimation block/module 122 to the base station 102 as a data packet.

The base station 102 may include a receiver 106, a channel variation metric computation block/module 108, an operations block/module 110 and a transmitter 112. It should be noted that one or more of the elements 106, 108, 110 and 112 included in the base station 102 may be implemented in hardware, software or a combination of both. Furthermore, the term "block/module" may indicate that a particular element may be implemented in hardware, software or a combination of both. It should also be noted that although some of the elements 106, 108, 110 and 112 may be illustrated as a single block, multiple blocks/modules may be employed in some configurations.

The base station 102 may also include an antenna 114. One antenna 114 is shown separately for the sake of simplicity. In addition, the base station 102 may include multiple antennas 114 that each receive and transmit signals.

The receiver 106 may receive feedback from one or more wireless communication devices 104, for example, as a data packet. The feedback may be a channel report that includes channel estimations obtained by the wireless communication device 104. The receiver 106 may be coupled to the channel variation metric computation block/module 108. Accordingly, the receiver 106 may provide feedback to the channel variation metric computation block/module 108.

The channel variation metric computation block/module 108 may determine a channel variation metric based on the feedback in the channel report. For example, the channel variation metric computation block/module 108 may determine a channel variation metric based on the channel measurements in the feedback received from the wireless communication device 104. For instance, the channel variation metric computation block/module 108 may compare channel measurements from different packets received from the wireless communication device 104. In some instances, the channel variation metric may approximate a mean square error (MSE) value based on the feedback.

In addition, the channel variation metric may be insensitive to amplitude gain and phase variations (e.g., timing changes). In other words, the channel variation metric may be determined regardless of the phase or amplitude of the packets being compared. For example, using absolute values may make the method insensitive to timing and phase differences between any two channel estimates from the same wireless communication device 104. Determining the channel variation metric is described in additional detail below in connection with FIG. 3.

The channel variation metric computation block/module 108 may be coupled to an operations block/module 110. Once the channel variation metric is determined, the channel variation metric computation block/module 108 may provide the channel variation metric to the operations block/module 110. The operations block/module 110 may perform an operation based on the channel variation metric.

The operations block/module 110 may include an optional mode selection block/module 150 and/or an optional feedback requester block/module 152. The operations block/module 110 may perform an operation based on the channel variation metric, such as switching between modes or sending feedback requests. For example, the mode selection block/module 150 may switch the base station 102 between operating modes, such as open loop mode, SU-MIMO mode or MU-MIMO mode, based on the channel variation metric. For instance, the mode selection block/module 150 may switch from a MU-MIMO mode to a SU-MIMO mode if the channel variation metric for a wireless communication device 104 is below a threshold.

The operations block/module 110 may request feedback (e.g., a channel report) based on the channel variation metric. For example, if the channel variation metric indicates an MSE value above or below a threshold, the feedback requester block/module 152 may request feedback (e.g., more or less feedback) if the MSE value is above or below threshold.

The operations block/module 110 may be coupled to the transmitter 112. The operations block/module 110 may provide feedback requests, for example, to the transmitter 112 to be sent to the wireless communication device 104. The transmitter 112 may also send out data packets. For example, if the operations block/module 110 is switching to MU-MIMO mode, then the base station 102 may transmit a MU-MIMO packet to the wireless communication device 104.

Figure 2:
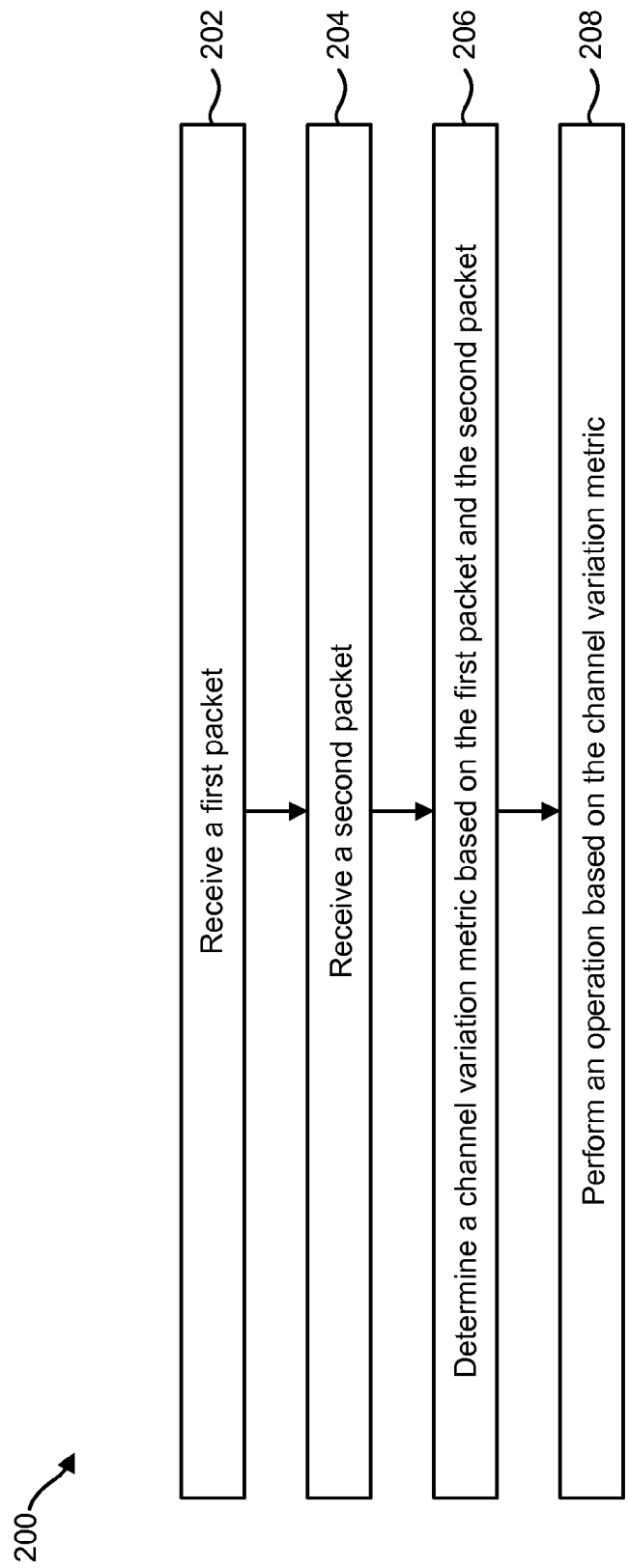
FIG. 2 is a flow diagram illustrating one configuration of a method for determining a channel variation metric.

FIG. 2 is a flow diagram illustrating one configuration of a method 200 for determining a channel variation metric. The method 200 may be performed by a base station 102. For example, the base station 102 may be part of the wireless communication system 100 described in connection with FIG. 1. For instance, the base station 102 may communicate with one or more wireless communication devices 104.

The base station 102 may receive 202 a first packet. The first packet may be received at the receiver 106. The first packet may include feedback received from the wireless communication device 104. For example, the first packet may include a feedback report (e.g., compressed feedback report) from the wireless communication device 104. The first packet may represent a first set of channel data fed back from the wireless communication device 104.

The base station may obtain a number of values based on the first packet. For example, if 16 subcarriers and four base station 102 antennas 114 are used, then the base station 102 may obtain 64 values based on the first packet. The values may be used by the base station 102 to determine (e.g., derive) a channel variation metric. For example, the base station 102 may utilize a part of (e.g., a subset of) the subcarriers (where the number of subcarriers may be 52 to 242 for 802.11 packets, for example) to estimate a channel MSE (e.g., channel Doppler metric). As used herein, the term "subcarrier tone" or "subcarrier number" may refer to numbers or values within the feedback report that excludes pilots and direct current (DC) tones. Additional description of subcarrier tones is provided in connection with FIG. 7.

The base station 102 may receive 204 a second packet. The second packet may be received at the receiver 106. The second packet may be received from the wireless communication device 104 and may include similar data as or different data from the first packet. The base station 102 may obtain a number of values based on the second packet. For example, the base station 102 may obtain the same number of values from the second packet as from the first packet.

The values may differ between the first packet and the second packet if the channel estimations and measurements on the wireless communication device 104 have changed. For example, if the wireless communication device 104 is in a slow Doppler state (e.g., the wireless communication device 104 is not changing location), the channel estimations and measurements may be similar (e.g., changed relatively little) for the first packet and the second packet. However, if the wireless communication device 104 is in a fast Doppler state (e.g., the wireless communication device is moving between locations), the data in the channel estimations and measurements between the first packet and the second packet may differ more.

The base station 102 may determine 206 a channel variation metric based on the first packet and the second packet. The channel variation metric may be determined by the channel variation metric computation block/module 110. The base station 102 may compare data in the first packet with data in the second packet. For example, the first packet and the second packet may each include values corresponding to a subset of subcarrier tones for each antenna 114. In this example, each value from the first packet may be compared with the corresponding value from the second packet. The base station 102 may determine the channel variation metric based on data in the first packet compared with data in the second packet, for example. In some configurations, the base station 102 may determine 206 a channel variation metric that approximates a mean square error (MSE) value based on a first channel estimate corresponding to the first packet and a second channel estimate corresponding to the second packet. Determining the channel variation metric is described in greater detail below, in connection with FIG. 3.

The base station 102 may perform 208 an operation based on the channel variation metric. The operation may be performed by the operations block/module 110. For example, the operation may be switching modes or requesting feedback. For instance, the operations block/module 110 may switch from a MU-MIMO mode to a SU-MIMO mode for a wireless communication device 104 based on the channel variation metric of the wireless communication device 104.

Figure 3:
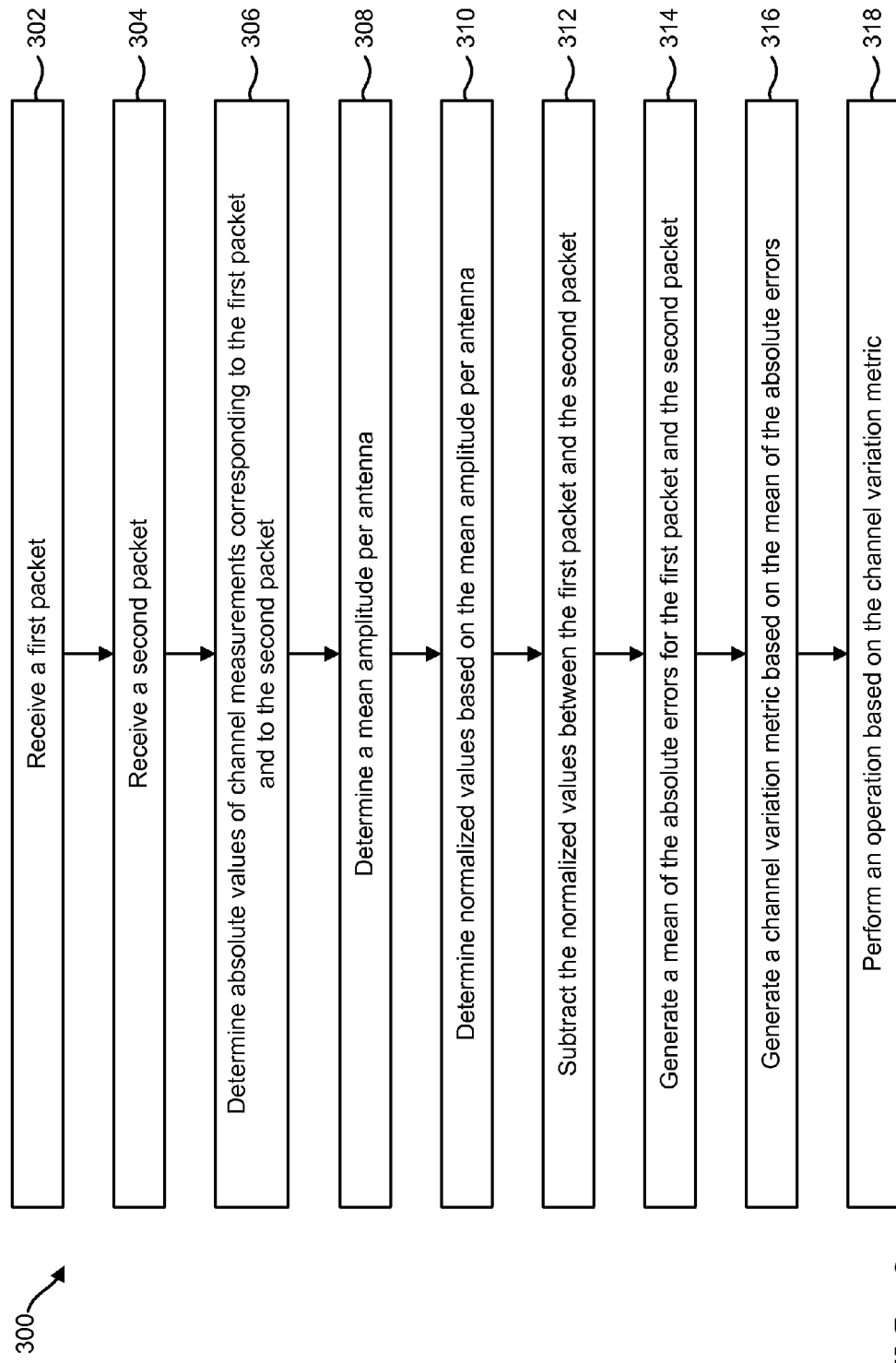
FIG. 3 is a flow diagram illustrating a more specific configuration of a method for determining a channel variation metric.

FIG. 3 is a flow diagram illustrating a more specific configuration of a method 300 for determining a channel variation metric. The method 300 may be performed by a base station 102. For example, the base station 102 may be part of the wireless communication system 100 described in connection with FIG. 1. For instance, the base station 102 may communicate with a wireless communication device 104.

The base station 102 may receive 302 a first packet. The base station 102 may receive 304 a second packet. The base station 102 may receive the first packet and the second packet as described above in connection with FIG. 2. For example, the first packet and the second packet may each include values corresponding to a number of subcarrier tones transmitted from the base station 102 and received at the wireless communication device 104. In one example, a first channel estimate corresponding to (e.g., indicated by) the first packet may be denoted $H_{0k}$ and a second channel estimate corresponding to (e.g., indicated by) the second packet may be denoted $H_{1k}$. For instance, the method 300 may be applied to estimate a channel MSE (e.g., channel Doppler metric) between channel $H_{0k}$ and $H_{1k}$.

The base station 102 may determine 306 absolute values of channel measurements corresponding to the first packet and the second packet. For example, if the wireless communication device 104 estimates channel measurements for 16 subcarrier tones on 4 antennas, then the wireless communication device 104 may include 64 channel measurement values. In this case, the result would be a 4×1 vector for each subcarrier tone, where the column represents the subcarrier tone and each row corresponds to an antenna. Thus, if there were 8 antennas, the result would be a 8×1 vector for each subcarrier tone. Absolute values of channel measurements may be determined 306 by the channel variation metric computation block/module 108, for instance.

At a first instance of time, the wireless communication device 104 may transmit measured channel measurement values to the base station 102 included in the first packet. At a second instance of time, the wireless communication device 104 may transmit measured channel measurement values to the base station 102 included in the second packet. The base station 102 may determine 306 absolute values of the channel measurements corresponding to the first packet and the second packet by taking the absolute values of each value. For example, in the case of 64 channel measurement values, the base station 102 may obtain 64 absolute channel measurement values. By using the absolute values of the channel measurements for both the first packet and the second packet, timing and phase mismatch (e.g., delay) may be ignored when comparing values in the first packet and the second packet. In other words, employing absolute values allows the channel variation metric to be determined between the first packet and the second packet even if the first packet and the second packet were received with phase differences at the base station 102.

In one example, determining 306 the absolute values of channel measurements corresponding to the first packet and to the second packet may be denoted as $A_{0k}=|H_{0k}|$ and $A_{1k}=|H_{1k}|$, where $A_{0k}$ is the element-wise absolute value of the first channel measurement (e.g., estimate) and $A_{1k}$ is the element-wise absolute value of the second channel measurement (e.g., estimate). In the case where there is a 4×1 vector for each tone, $A_{0k}$ and $A_{1k}$ include element-wise absolute values, resulting in two 4×1 real vectors per tone. As described above, using absolute values in this manner may make the algorithm insensitive to timing and phase differences between the two channel estimates.

The base station 102 may determine 308 a mean amplitude per antenna. For example, the number of base station 102 (e.g., access point) antennas 114 may correspond to the number of rows in a channel matrix. The mean amplitude per antenna may be determined 308 by the channel variation metric computation block/module 108, for example. There may be one or more antennas for which the mean amplitude is determined 308. For instance, in the example of 4 antennas and 16 subcarrier tones reported as feedback, the base station 102 may calculate a mean amplitude per antenna over the 16 subcarrier tones (e.g., 4 values averaged over 16 tones). Thus, in the example of 4 antennas, 4 mean amplitudes may be determined. In some configurations, each mean amplitude may be determined 308 based on absolute values of each of the channel measurement values.

The base station 102 may determine 310 normalized values based on the mean amplitude per antenna. Normalized values may be determined 310 by the channel variation metric computation block/module 108, for example. Normalization allows channel measurement values to be compared between the first packet and the second packet regardless of amplitude or gain (e.g., radio frequency gain) differences that may occur between the channel estimates and/or channel measurements. In other words, normalization may make the method 300 insensitive to any radio frequency (RF) gain differences between two channel estimates from the same wireless communication device 104.

The base station 102 may determine 310 normalized values by dividing the values from each antenna by the mean amplitude calculated for that same antenna. For example, the base station 102 may divide each row of $A_{0k}$ and $A_{1k}$ by its mean amplitude. For instance, in the case of 4 antennas and 16 subcarrier tones, each of the 4 antennas has 16 subcarrier tones and one mean amplitude value. The 16 subcarrier tones for the first antenna are divided by the mean amplitude value determined for the first antenna. This process may be repeated for each antenna (e.g., the second antenna, the third antenna and the fourth antenna, etc.). Further, the process may be repeated for both the first packet and the second packet. Accordingly, there may be 64 normalized channel measurement values corresponding to the first packet and 64 normalized channel measurement values corresponding to the second packet.

The base station 102 may subtract 312 the normalized values between the first packet and the second packet. The normalized values may be subtracted 312 by the channel variation metric computation block/module 108, for example. Subtracting 312 the normalized values may yield the errors across all rows and tones (e.g., 64 values in total). For example, the base station 102 may subtract the normalized values corresponding to the first packet from the normalized values corresponding to the second packet. Accordingly, a set of error channel measurements is generated with the number of channel measurement error values corresponding to the number of channel measurement values in the first packet and the second packet. For example, if the first packet and the second packet each include 64 channel measurement values, then the set of error channel measurements likewise includes 64 channel measurement error values. Alternatively, the base station 102 may subtract the normalized values corresponding to the second packet from the normalized values corresponding to the first packet.

In some configurations, the absolute value of the set of channel measurement error values is calculated. By calculating the absolute value of the channel measurement error values, subtracting the channel measurement values of the first packet from the second packet yields the same results as subtracting the channel measurement values of the second packet from the first packet. In this manner, the channel measurement error values may be absolute error values.

The base station 102 may generate 314 a mean of the absolute error values. The base station 102 may sum together each channel measurement error value and divide the total by the number of channel measurement error value summed to generate a mean of the absolute errors. In other words, the mean of the absolute errors may be the mean of the absolute errors across all rows and tones between the first packet and the second packet.

The mean of the absolute errors may be generated 314 by the channel variation metric computation block/module 108, for example. For instance, if there are 64 error values, then each of the 64 error values may be added together and divided by 64 to obtain a mean absolute error (e.g., a mean of the absolute errors). The mean absolute error may serve as a close approximation of the root mean square (RMS) value between the first packet and the second packet. In some configurations, the channel variation metric may approximate a mean square error (MSE) value.

The base station 102 may generate 316 a channel variation metric based on the mean of the absolute errors. The channel variation metric may be generated 316 by the channel variation metric computation block/module 108, for example. The base station 102 may generate 316 the channel variation metric by converting the mean of the absolute errors into a decibel (dB) value. For example, the base station 102 may compute a logarithmic value of the mean of the absolute errors. For instance, the base station 102 may compute the channel variation metric as 20 $\log_{10}$ of the mean of the absolute errors. By employing dB units for the channel variation metric, the channel variation metric may be easily compared to a threshold. Additionally, the channel variation metric may also be adjusted for bias and other factors once in dB form.

In some configurations, the channel variation metric may be generated 316 by employing look-up tables (LUT). For example, the mean of the absolute errors may be input in to a LUT, and the LUT may output the channel variation metric.

In some configurations, the base station 102 may complete steps 306, 308 and 310 on the physical layer (PHY) for each channel estimate. The base station 102 may then provide the normalized channel measurement values (e.g., 64 normalized amplitude values) to the media access control layer (MAC) to be stored with the received uplink channel estimates (e.g., the first packet and the second packet). Steps 312, 314 and 316 may then be performed on the MAC. For instance, the MAC may subtract 312 the normalized amplitude values (e.g., 64 normalized amplitude values) of two different channel estimates and generate (e.g., calculate) 314 the mean of the absolute values (e.g., 64 absolute values) of the subtracted outputs. The MAC may additionally convert the result to dBs and subtract a bias (e.g., a 4 dB bias), which may be done through a LUT in some configurations.

The base station 102 may perform 318 an operation based on the channel variation metric. The operation may be performed by the operations block/module 110. The operation may be switching modes or requesting feedback, for example. For instance, the mode selection block/module 150 may switch from a MU-MIMO mode to a SU-MIMO mode based on the channel variation metric, such as if the channel variation metric is above or below a threshold value. As one example, switching from MU-MIMO mode to SU-MIMO mode may occur if the channel Doppler SNR (signal to noise ratio) is 10 dB lower than the estimated uplink SNR, for instance. The channel Doppler SNR may be the channel Doppler metric mean square error, estimated in dB, multiplied by −1. For instance, the estimated uplink SNR may be derived through conventional techniques, such as by measuring noise power levels before a packet and measuring signal levels during received uplink packets.

In another example, switching from MU-MIMO mode to SU-MIMO mode may occur if the channel Doppler SNR is less than a fixed threshold of, for instance, 15 dB. Since the measured SNR is upper-limited by quantization noise and other impairments, MU-MIMO mode may be employed when the channel Doppler SNR exceeds a threshold (e.g., 30 dB).

Figure 4:
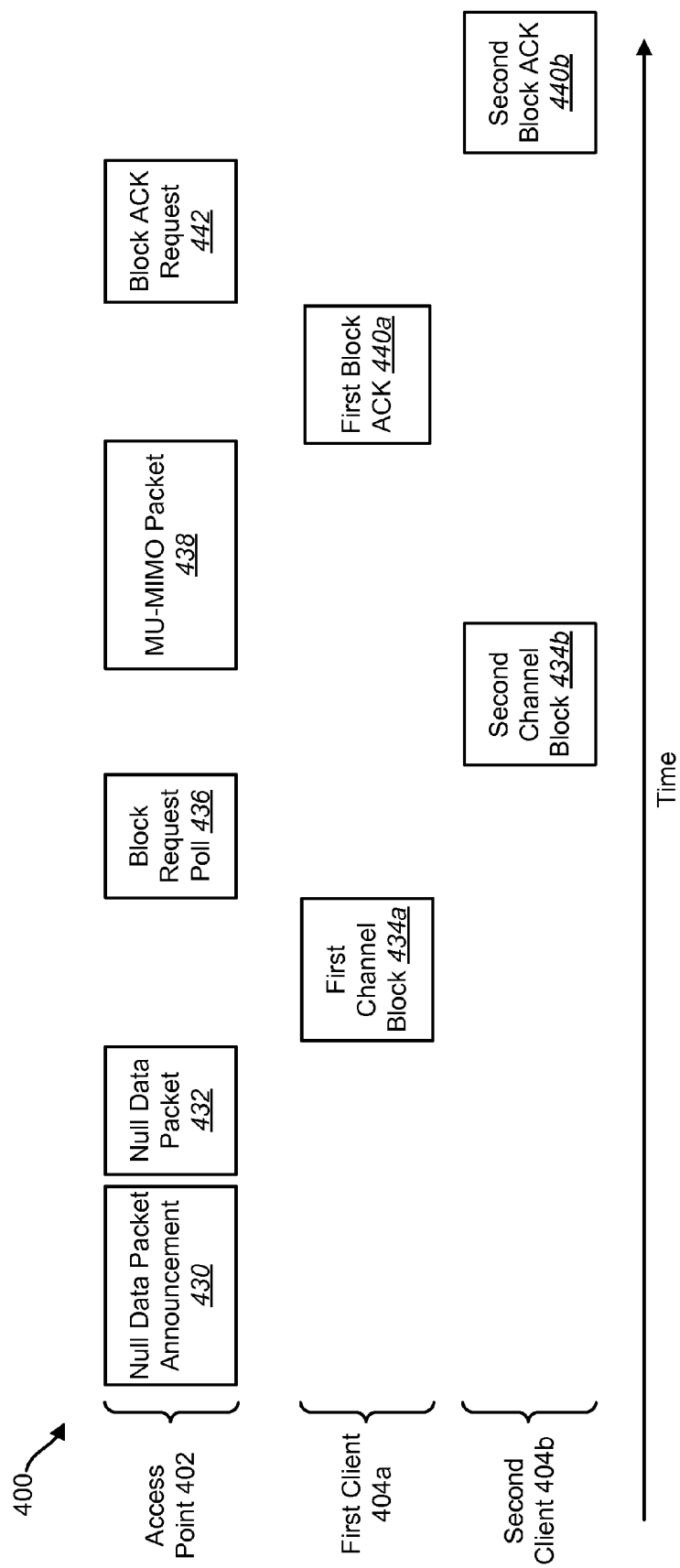
FIG. 4 is a packet diagram illustrating one configuration of sending and receiving packets used to determine a channel variation metric in a wireless communication system.

FIG. 4 is a packet diagram illustrating one configuration of sending and receiving packets used to determine a channel variation metric in a wireless communication system 400. The wireless communication system 400 may include an access point 402, a first client 404a and a second client 404b. The packets illustrated in FIG. 4 may all be sent from the devices shown on the left of the figure (e.g., the access point 402, the first client 404a and the second client 404b). In particular, packets corresponding to the access point 402 may be sent on a downlink to the first client 404a and/or to the second client 404b. Additionally, packets corresponding to the clients 404a-b may be sent on an uplink to the access point 402.

The access point 402 may be one example of a base station 102 described in connection with FIG. 1. Similarly, the first client 404a and the second client 404b may each be an example of the one or more wireless communication devices 104 described in connection with FIG. 1.

The access point 402 may send one or more packets to the first client 404a and the second client 404b. For example, the access point 402 may send a null data packet announcement 430 and a null data packet 432 to the first client 404a and to the second client 404b. The null data packet announcement 430 and/or the null data packet 432 may sound the wireless communication system 400 to determine if the first client 404a and the second client 404b are present.

The first client 404a and the second client 404b may respond to the null data packet announcement 430 and/or the null data packet 432. For example, the first client 404a may send a first channel block 434a to the access point 402. The first channel block 434a may include feedback, such as a channel report that includes channel measurements and/or estimations taken by the first client 404a.

In some approaches, the access point 402 may send a block request poll 436 to request feedback (e.g., a channel report). For example, the access point 402 may send the block request poll 436 to the second client 404b to request feedback from the second client 404b. In response to the block request poll 436, the second client 404b may send a second channel block 434b to the access point 402. The second channel block 434b may include feedback (e.g., a channel report). In some configurations, the channel report may include compressed channel feedback.

The access point 402 may send a MU-MIMO packet 438 to the first client 404a and the second client 404b. The MU-MIMO packet 438 may indicate that the access point 402 is operating in MU-MIMO mode and/or may include data transmitted in a MU-MIMO format. The first client 404a may respond with a first block acknowledgement (ACK) 440a. In some configurations, the MU-MIMO packet 438 may be sent to the first client 404a and the second client 404b without requesting feedback.

In some configurations, (if the access point 402 does not receive a block ACK from the second client 404b, for example), the access point 402 may send a block ACK request 442 to the second client 404b. The second client 404b may respond by sending the access point 402 a second block ACK 440b.

The access point 402 may use data in the channel block 434 and the block ACK 440 to determine a channel variation metric. For example, the access point 402 may use the preamble data in the first channel block 434a and corresponding preamble data in the first block ACK 440a to determine a channel variation metric, where the preamble data includes feedback. For instance, the first channel block 434a may correspond to feedback from a first packet and the first block ACK 440a may correspond to feedback from a second packet.

Based on the feedback in the first packet and the second packet, the access point 402 may calculate an MSE value (e.g., channel variation metric). In this manner, the access point 402 may determine a channel variation metric. In an MU-MIMO transmit opportunity (TXOP), for example, the access point 402 receives at least two uplink frames (e.g., preamble data) from each wireless communication device 404a, 404b (e.g., client) that may be used to estimate the channel variation metric (e.g., MSE). If the MSE value is above a threshold, the access point 402 may send additional MU-MIMO packets 438 without requesting additional feedback.

The access point 402 may perform an operation based on the channel variation metric. For example, if the first client 404a is determined to be in a fast Doppler state (e.g., moving rapidly between locations), then the access point 402 may request that feedback be sent more frequently to the access point 402. As another example, if the first client 404a and the second client 404b are both determined to be in a slow Doppler state, the access point 402 may determine to switch to a MU-MIMO state for both the first client 404a and the second client 404b.

Figure 5:
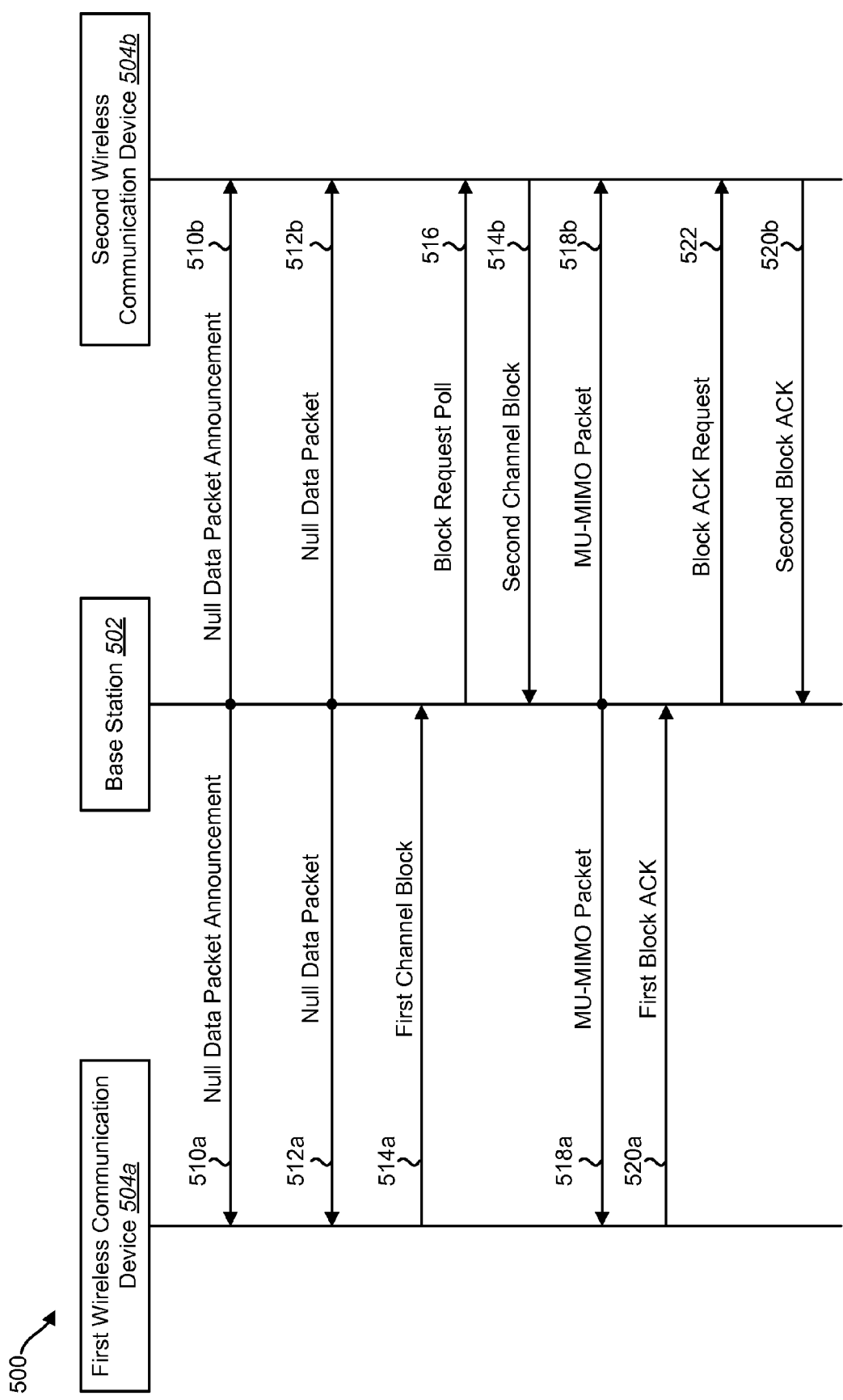
FIG. 5 is a call flow diagram illustrating one configuration of a wireless communication system for determining a channel variation metric.

FIG. 5 is a call flow diagram illustrating one configuration of a wireless communication system 500 for determining a channel variation metric. The wireless communication system 500 may include a base station 502, a first wireless communication device 504a and a second wireless communication device 504b. The base station 502 may be one example of a base station 102 described in connection with FIG. 1. Similarly, the first wireless communication device 504a and the second wireless communication device 504b may each be an example of the one or more wireless communication devices 104 described in connection with FIG. 1.

The base station 502 may send one or more packets to the first wireless communication device 504a and the second wireless communication device 504b. For example, the base station 502 may send 510a a null data packet announcement 430 to the first wireless communication device 504a. The base station 502 may also send 510b the null data packet announcement 430 to the second wireless communication device 504b. The base station 502 may send 512a a null data packet 432 to the first wireless communication device 504a. The base station 502 may send 512a a null data packet 432 to the second wireless communication device 504b. The null data packet announcement 430 and/or the null data packet 432 may be employed to sound the wireless communication system 500 to determine if the first wireless communication device 504a and/or the second wireless communication device 504b are present.

The first wireless communication device 504a may respond to the null data packet announcement 430 and/or the null data packet 432. For example, the first wireless communication device 504a may send 514a a first channel block 434a to the base station 502. The first channel block 534a may include feedback, such as a channel report that includes channel measurements and/or estimation taken by the first wireless communication device 504a.

In some configurations, the base station 502 may send 516 a block request poll 436 to request feedback (e.g., a channel report). For example, the base station 502 may send the block request poll 436 to the second wireless communication device 504b to request feedback if the second wireless communication device 404b has not sent feedback to the base station 502. In response to the block request poll 436, the second wireless communication device 504b may send 514b a second channel block 434b to the base station 502. The second channel block 434b may include a channel report that includes channel measurements and/or estimations by the second wireless communication device 504b.

The base station 502 may send 518a a MU-MIMO packet 438 to the first wireless communication device 504a. The base station 502 may also send 518b a MU-MIMO packet 438 to the second wireless communication device 504b. The MU-MIMO packet 438 may indicate that the base station 502 is operating in MU-MIMO mode. The first wireless communication device 504a may respond by sending 520a a first block acknowledgement (ACK) 440a to the base station 502.

If the base station 502 does not receive a block ACK from the second wireless communication device 504b, the base station 502 may send 522 a block ACK request 442 to the second wireless communication device 504b. The second wireless communication device 504b may respond by sending 520b the base station 502 a second block ACK 440b.

The base station 502 may use data in the channel block 434 and the block ACK 440 to determine a channel variation metric. For example, the second channel block 434b may correspond to a first packet and the second block ACK 440b may correspond to a second packet from the second wireless communication device 504b. The base station 502 may approximate an MSE value (e.g., channel variation metric) based on the first packet and the second packet.

The base station 502 may determine a channel variation metric based on the first packet and the second packet. The base station 502 may then perform an operation based on the channel variation metric. For example, if the first wireless communication device 504a is determined to be in a fast Doppler state (e.g., moving rapidly between locations) and the second wireless communication device 504b is determined to be in a slow Doppler state, the base station 502 may switch from SU-MIMO for the first wireless communication device 504a and to MU-MIMO for the second wireless communication device 504b.

Figure 6:
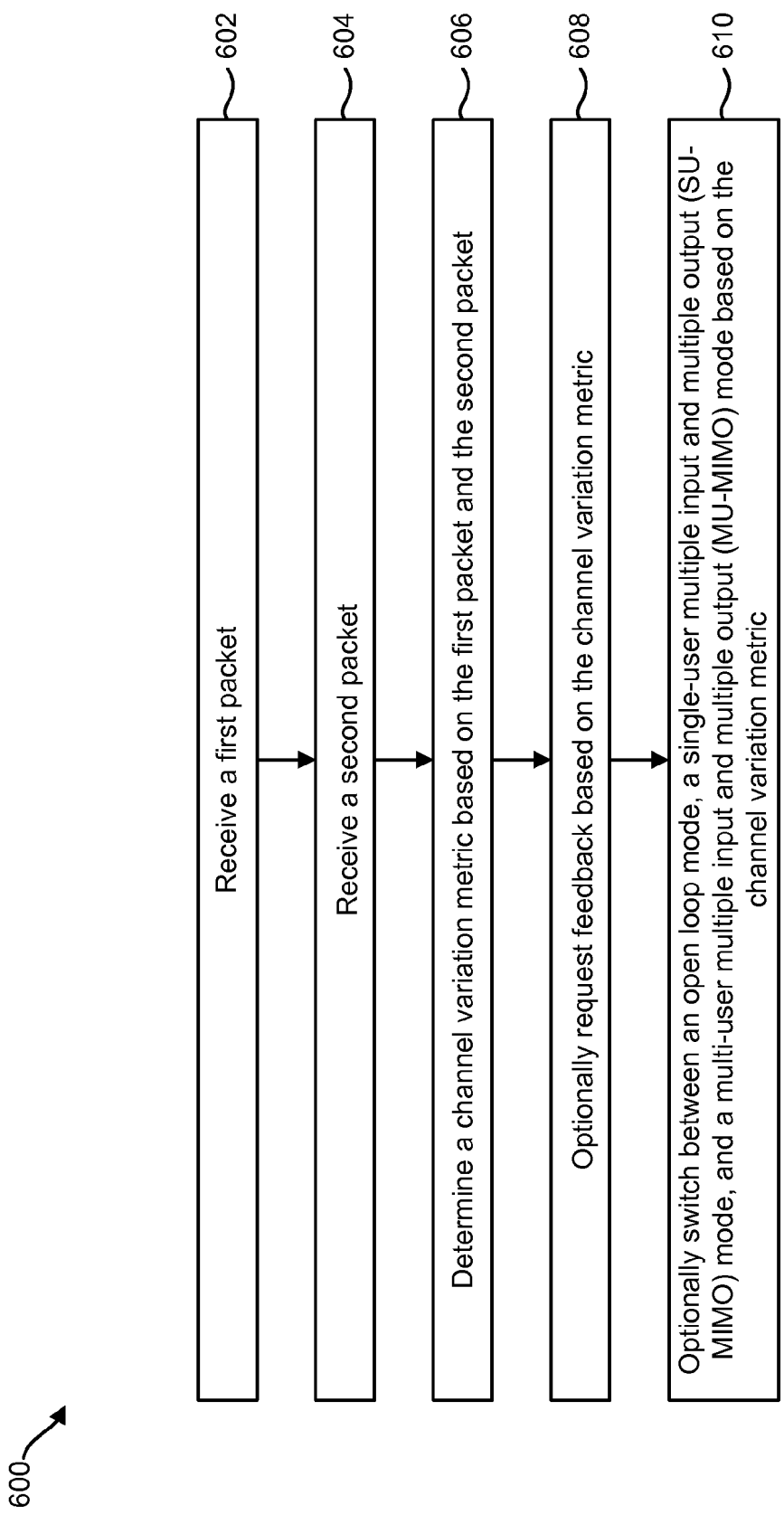
FIG. 6 is a flow diagram illustrating another more specific configuration of a method for determining a channel variation metric.

FIG. 6 is a flow diagram illustrating another more specific configuration of a method 600 for determining a channel variation metric. The method 600 may be performed by a base station 102. For example, the base station 102 may be part of the wireless communication system 100 described in connection with FIG. 1. For instance, the base station 102 may communicate with a wireless communication device 104.

The base station 102 may receive 602 a first packet. The base station 102 may receive 604 a second packet. The base station 102 may receive the first packet and the second packet as described above in connection with FIG. 2.

The base station 102 may determine 606 a channel variation metric based on the first packet and the second packet. The channel variation metric may be determined by the channel variation metric computation block/module 110. The base station 102 may determine 606 a channel variation metric based on the first packet and the second packet as described above in connection with FIG. 2 and FIG. 3.

The base station 102 may optionally request 608 feedback based on the channel variation metric. Feedback may be requested by the feedback requester block/module 152, for example. Feedback may be requested based on the state of the wireless communication device 104. For example, if the wireless communication device 104 is determined to be in a fast Doppler state, the base station 102 may request that feedback (e.g., a channel report) from the wireless communication device 104 be sent with increased frequency. If the wireless communication device 104 is determined to be in a slow Doppler state, the base station 102 may request that feedback from the wireless communication device 104 be sent with less frequency.

In some cases, the frequency may correspond to a maximum time in which the wireless communication device must send a channel report to the base station 102. The maximum time may differ depending if the base station 102 is in MU-MIMO mode or SU-MIMO mode. For instance, the base station 102 may request feedback from the wireless communication device 104 at least every 20 ms when the base station 102 is employing MU-MIMO and at least every 200 ms when the base station 102 is employing SU-MIMO. In this manner, the base station 102 may request 608 feedback based on a maximum time between feedback requests for MU-MIMO mode and SU-MIMO mode.

In some configurations, the base station 102 may request feedback when the channel variation metric is above or below a threshold. For example, if the channel variation metric of the wireless communication device 104 is below a threshold, the base station 102 may send a feedback request to the wireless communication device 104 to send feedback more periodically.

The base station 102 may optionally switch 610 between an open loop mode, a single-user multiple input and multiple output (SU-MIMO) mode, and a multi-user multiple input and multiple output (MU-MIMO) mode based on the channel variation metric. The mode selection block/module 150 on the base station 102 may facilitate the switch between modes. The channel variation metric may indicate to the base station 102 if the wireless communication device 104 may communicate with the base station using SU-MIMO and/or MU-MIMO. If the wireless communication device 104 cannot communicate with the base station 102 using SU-MIMO and/or MU-MIMO, the base station 102 may need to switch to open-loop before communicating with the wireless communication device 104. In some configurations, the base station 102 may send an indicator to the wireless communication device 104 indicating a switch between modes.

In some configurations, the base station 102 may determine a first channel variation metric from a first wireless communication device 504a and a second channel variation metric second wireless communication device 504b. Based on the first channel variation metric, the base station 102 may switch to MU-MIMO mode when communicating with the first wireless communication device 504a. Based on the second channel variation metric, the base station 102 may switch to SU-MIMO mode when communicating with the second wireless communication device 504b.

Figure 7:
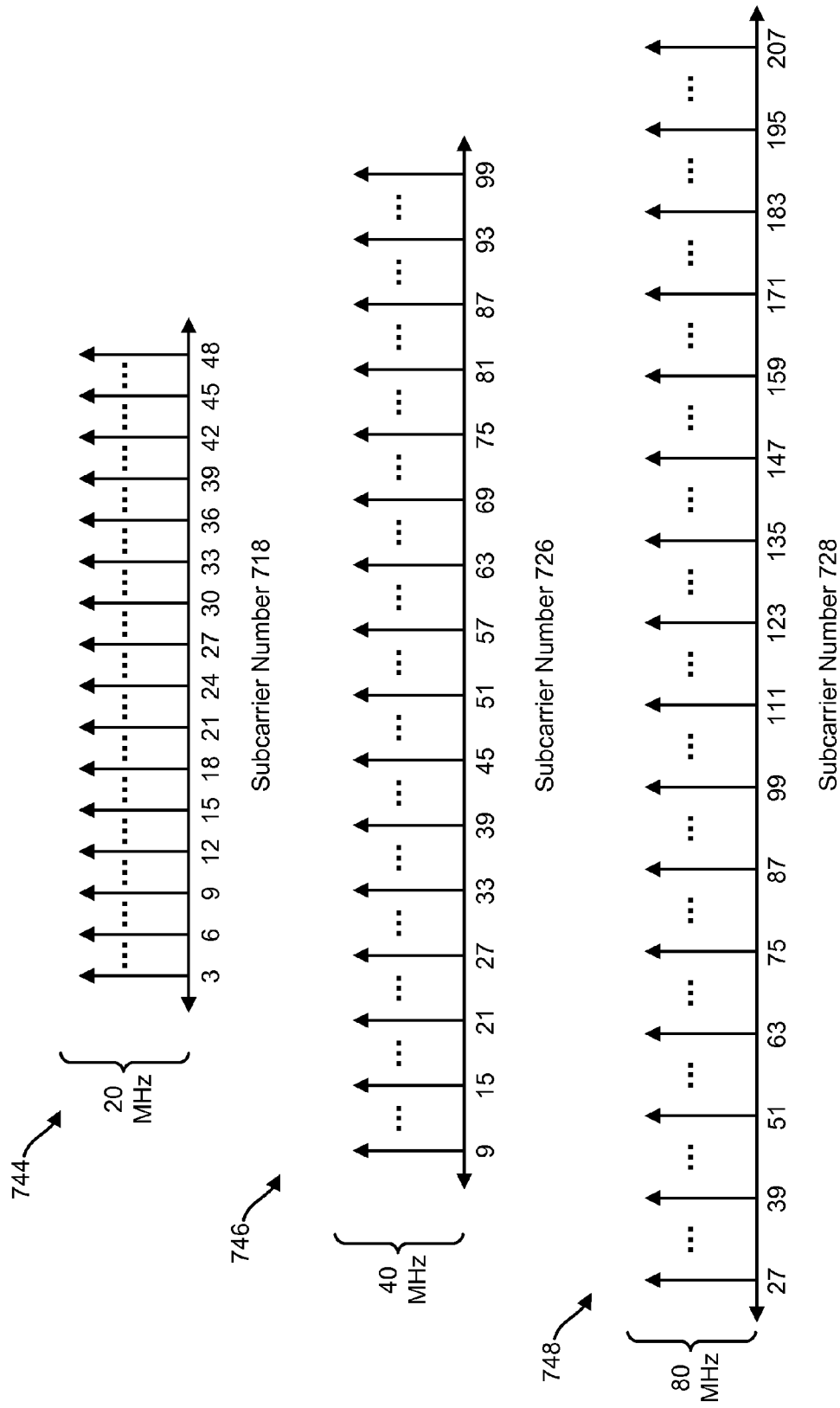
FIG. 7 is a diagram illustrating one example of subcarrier tones for a 20 megahertz (MHz) signal, a 40 MHz signal and an 80 MHz signal in accordance with the systems and methods disclosed herein.

FIG. 7 is a diagram illustrating one example of subcarrier tones for a 20 megahertz (MHz) signal 744, a 40 MHz signal 746 and an 80 MHz signal 748 in accordance with the systems and methods disclosed herein. Each of the signals includes subcarrier tones signified by a subcarrier number. The subcarrier number may refer to number within a channel report (e.g., compressed feedback report) that excludes pilot and DC tones. For example, the 20 MHz signal 744 includes subcarrier numbers 718 that range from 3 to 48, in increments of 3. The 40 MHz signal 746 includes subcarrier numbers 726 that range from 9 to 99, in increments of 6. The 80 MHz signal 748 includes subcarrier numbers 728 that range from 27 to 207, in increments of 12. By way of example, a subset of 16 subcarrier tones are illustrated in the 20 MHz signal 744, the 40 MHz signal 746 and the 80 MHz signal 748. It should be appreciated that a different number of subcarrier tones may be employed. For example, the number of subcarrier tones may exceed 16, such as 32, 64, 128, 234, etc. subcarrier tones. For instance, MSE estimates between two different 1×4 uplink channel estimates with amplitude and phase changes per chain with 234 tones (for an 80 MHz band) may be shown to have less than a ±1 dB error (for 5% to 95% cumulative distribution function values). This is where the estimated MSE has a −4 dB corrected bias (while for a large MSE around −10 dB, the bias may be closer to −5 dB). With 16 tones, the MSE estimate may be accurate to within ±2 dB. However, if fewer than 16 subcarrier tones are used, the accuracy of the channel variation metric may be decreased. Also, while the 20 MHz signal 744, the 40 MHz signal 746 and the 80 MHz signal 748 are illustrated, it should be appreciated that a 160 MHz signal or other signal bandwidth may also be employed.

Further, it should be noted that while the subcarrier tones are evenly mapped (e.g., distributed) in the examples illustrated in FIG. 7, exact mapping is not critical as long as there is some spread of the subcarrier tones (e.g., 16 tones) across the entire bandwidth. In some configurations, some band edge tones may be dropped, which may have worse signal-to-interference-noise ratio (SINR) because of transmit and receive filtering. Thus, in some configurations, the subcarrier tomes may be mapped to be grouped closer to the middle of the bandwidth.

Each subcarrier tone may be represented by $H_k = s_k V_k$, where H is the channel estimate, $s_k$ is a singular value and $V_k$ is a vector for tone k. k is a subcarrier number (e.g., {3, 6, . . ., 48} for 20 MHz, {9, 15, 21, . . . , 99} for 40 MHz and {27, 39, 51, . . . , 207} for 80 MHz). Vector V may correspond to the number of antennas on the base station 102 that transmit MIMO data to a wireless communication device 104 at one time. For example, if the wireless communication device 104 receives data streams from 4 antennas 114 on the base station 102, then vector V may be a 4×1 vector for each subcarrier tone k. Furthermore, channel estimates from 16 tones may be used. Assuming 16 subcarrier tones, there are 16 4×1 vectors, which results in 64 total vector values (e.g., channel measurement values).

Figure 8:
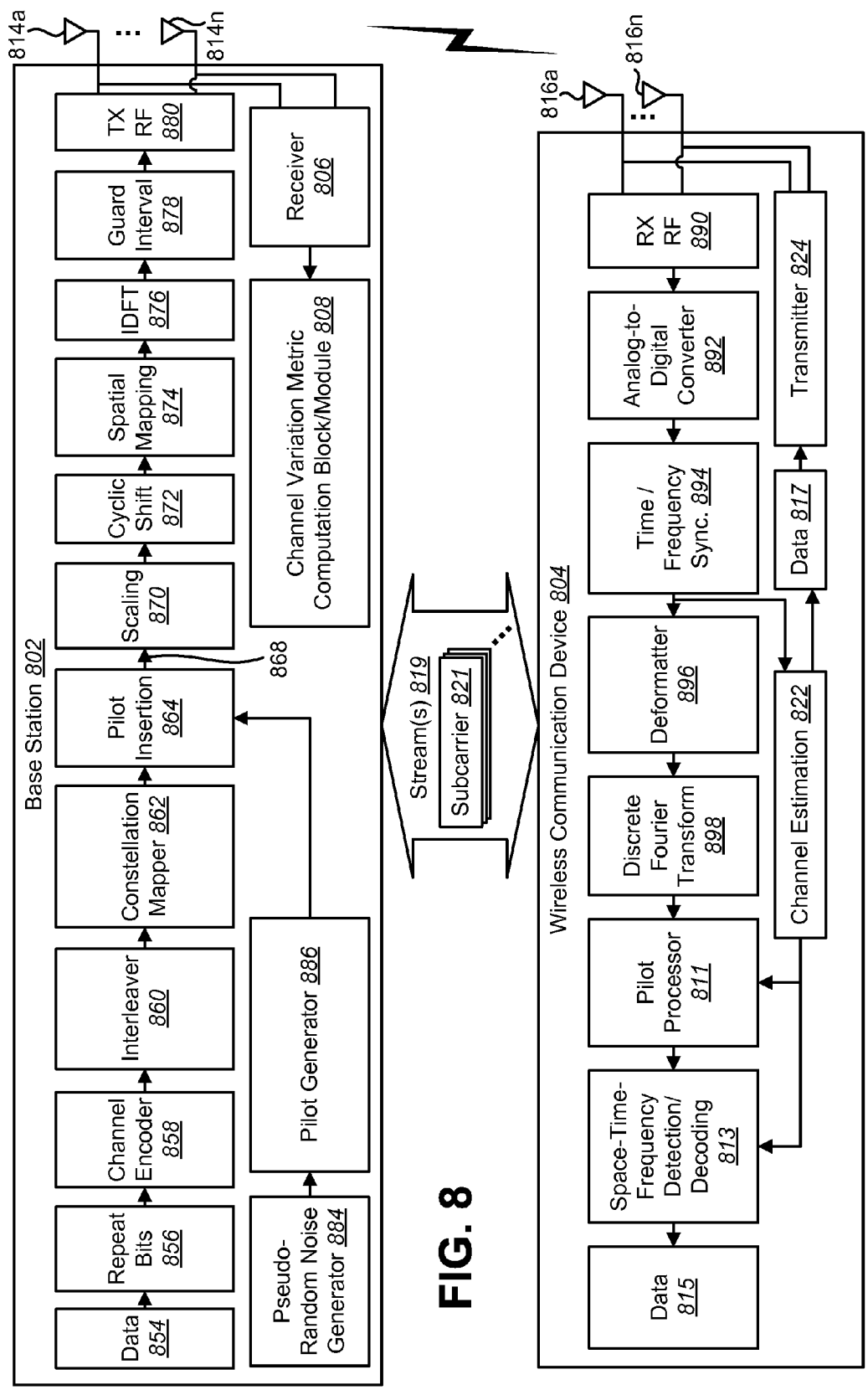
FIG. 8 is a block diagram illustrating one configuration of a base station and a wireless communication device in which systems and methods for determining a channel variation metric may be implemented.

FIG. 8 is a block diagram illustrating one configuration of a base station 802 and a wireless communication device 804 in which systems and methods for determining a channel variation metric may be implemented. The base station 802 may include a repeat bits block/module 856, a channel encoder 858, an interleaver 860, a constellation mapper 862, a pilot insertion block/module 864, a scaling block/module 870, a cyclic shift block/module 872, a spatial mapping block/module 874, an inverse discrete Fourier transform (IDFT) block/module 876, a guard interval block/module 878, a transmission (TX) radio frequency (RF) block/module, one or more antennas 814a-n, a pseudo-random noise generator 884, a pilot generator 886 and/or a receiver 806.

It should be noted that one or more of the elements 856, 858, 860, 862, 864, 870, 872, 874, 876, 878, 880, 884, 886, 806 included in the base station 802 may be implemented in hardware, software or a combination of both. Furthermore, the term "block/module" may indicate that a particular element may be implemented in hardware, software or a combination of both. It should also be noted that although some of the elements 856, 858, 860, 862, 864, 870, 872, 874, 876, 878, 880, 884, 886 may be illustrated as a single block, one or more of the elements 856, 858, 860, 862, 864, 870, 872, 874, 876, 878, 880, 884, 886 illustrated may comprise multiple parallel blocks/modules in some configurations. For instance, multiple channel encoders 858, multiple interleavers 860, multiple constellation mappers 862, multiple pilot insertion blocks/modules 864, multiple scaling blocks/modules 870, multiple cyclic shift blocks/modules 872, multiple spatial mapping blocks/modules 874, multiple IDFT blocks/modules 876, multiple guard interval blocks/modules 878 and/or multiple TX RF blocks/modules 880 may form multiple paths in some configurations.

For instance, separate streams 819 (e.g., space-time streams, spatial streams, etc.) may be generated and/or transmitted using separate paths. In some implementations, these paths are implemented with distinct hardware, whereas in other implementations, the path hardware is reused for more than one stream 819 or the path logic is implemented in software that executes for one or more streams 819. More specifically, each of the elements illustrated in the base station 802 may be implemented as a single block/module or as multiple blocks/modules.

The data 854 may comprise overhead (e.g., control) data and/or payload data. For example, payload data may include voice, video, audio and/or other data. Overhead data may include control information, such as information that specifies a data rate, modulation and coding scheme (MCS), channel bandwidth, etc.

In some configurations or instances, the data 854 may be provided to the repeat bits block/module 856, which may repeat (e.g., generate copies of) bits from the data 854. The (optionally repeated) data 854 may be provided to the channel encoder 858. The channel encoder 858 may encode data 854 for forward error correction (FEC), encryption, packeting and/or other encodings known for use with wireless transmission. For example, the channel encoder 858 may use binary convolutional coding (BCC).

The encoded data may be provided to the interleaver 860. The interleaver 860 may change bit ordering or interleave bits in order to more evenly spread channel errors over a sequence of bits. The interleaved bits may be provided to the constellation mapper 862. In some configurations, a separate interleaver 860 for 160 MHz signals may be provided.

The constellation mapper 862 maps the data provided by the interleaver 860 into constellation points (e.g., complex numbers). For instance, the constellation mapper 862 may use modulation schemes such as binary phase-shift keying (BPSK), quadrature amplitude modulation (QAM), etc. Where quadrature-amplitude modulation (QAM) is used, for example, the constellation mapper 862 might provide two bits per stream 819, per subcarrier 821, per symbol period. Furthermore, the constellation mapper 862 may output a 16-QAM constellation signal for each stream 819 for each data subcarrier 821 for each symbol period. Other modulations may be used, such as 64-QAM, which would result in a consumption of six bits per stream 819, per data subcarrier 821, per symbol period. Other variations are also possible. It should be noted that the constellation mapper 862 may allocate a number of subcarriers (e.g., OFDM tones) 821 and map the constellation points (e.g., symbols) to the subcarriers 821.

The pilot generator 886 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The base station 802 may include a pseudo-random noise generator 884 in some configurations. The pseudo-random noise generator 884 may generate a pseudo-random noise sequence or signal (e.g., values) used to scramble the pilot sequence. For example, the pilot sequence for successive OFDM symbols may be multiplied by successive numbers from the pseudo-random noise sequence, thereby scrambling the pilot sequence per OFDM symbol. This may be done in accordance with the equation $p_{n+z} P_n^k$, where $p_n$ is the pseudo-random noise sequence, $P_n^k$ is the pilot sequence (or pilot mapping matrix), and k is an OFDM tone (e.g., subcarrier 821) index.

The pilot insertion block/module 864 inserts pilot tones into pilot tone subcarriers 821. For example, the pilot sequence may be mapped to subcarriers 821 at particular indices. For instance, pilot symbols from the (scrambled) pilot sequence may be mapped to pilot subcarriers 821 that are interspersed with data subcarriers 821 and/or other subcarriers 821.

The combined data and pilot signal 868 may be provided to a scaling block/module 870. The scaling block/module 870 may scale pilot symbols and/or data symbols. In some configurations, the scaling block/module 870 scales the pilot symbols and/or data symbols the same way as for a DATA field.

The scaled signal (e.g., the output signal from the scaling block/module 870) may be provided to the cyclic shift block/module 872. The cyclic shift block/module 872 may insert cyclic shifts to one or more spatial streams 819 or space-time streams 819 for cyclic shift diversity (CSD).

The IDFT block/module 876 may perform an inverse discrete Fourier transform on the signal provided by the spatial mapping block/module 874. For example, the inverse discrete Fourier transform (IDFT) block/module 876 converts the frequency signals of the data 854 and inserted pilot tones into time domain signals representing the signal over the streams 819 and/or time-domain samples for a symbol period. In one configuration, for example, the IDFT block/module 876 may perform a 256-point inverse fast Fourier transform (IFFT). In some configurations, the IDFT block/module 876 may additionally apply a phase rotation to one or more 20 MHz subbands.

The signal output from the IDFT block/module 876 may be provided to the guard interval block/module 878. The guard interval block/module 878 may insert (e.g., prepend) a guard interval to the signal output from the IDFT block/module 876. For example, the guard interval block/module 878 may insert a long guard interval that is the same length as a guard interval for other fields in a frame preamble. In some configurations, the guard interval block/module 878 may additionally perform windowing on the signal.

The output of the guard interval block/module 878 may be provided to the transmission (TX) radio frequency (RF) block/module 880. The TX RF block/module 880 may upconvert the output of the guard interval block/module 878 (e.g., a complex baseband waveform) and transmit the resulting signal using the one or more antennas 814a-n. For example, the one or more TX RF blocks/modules 880 may output radio-frequency (RF) signals to one or more antennas 814a-n, thereby transmitting the data 854 that was input to the channel encoder 858 over a wireless medium suitably configured for receipt by one or more wireless communication device 804.

It should be noted that the base station 802 may determine channel bandwidth to be used for transmissions to one or more wireless communication devices 804. This determination may be based on one or more factors, such as wireless communication device 804 compatibility, number of wireless communication devices 804 (to use the communication channel), channel quality (e.g., channel noise) and/or a received indicator, etc. In one configuration, the base station 802 may determine whether the bandwidth for signal transmission is 20 MHz, 40 MHz, 80 MHz or 160 MHz.

One or more of the elements 856, 858, 860, 862, 864, 870, 872, 874, 876, 878, 880, 884, 886 included in the base station 802 may operate based on the bandwidth determination. For example, the repeat bits block/module 856 may (or may not) repeat bits based on the bandwidth for signal transmission. Additionally, the pilot generator 886 may generate a number of pilot tones based on the bandwidth for signal transmission.

Additionally, the constellation mapper 862 may map data 854 to a number of OFDM tones and the pilot insertion block/module 864 may insert pilot tones based on the bandwidth for signal transmission. Some configurations, the constellation mapper 862 may use a look-up table to determine the number of tones or subcarriers to use for a specified bandwidth.

One or more streams 819 may be differentiable at an access terminal (with some probability) or wireless communication device 804. For example, bits mapped to one spatial dimension are transmitted as one stream 819. That stream 819 might be transmitted on its own antenna 814 spatially separate from other antennas 814, its own orthogonal superposition over a plurality of spatially-separated antennas, its own polarization, etc. Many techniques for stream 819 separation (involving separating antennas 814 in space or other techniques that would allow their signals to be distinguished at a receiver, for example) are known and can be used.

In the example shown in FIG. 8, there are one or more streams 819 that are transmitted using the same or a different number of antennas 814a-n (e.g., one or more). In some instances, only one stream 819 might be available because of inactivation of one or more other streams 819.

In the case that the base station 802 uses a plurality of frequency subcarriers 821, there are multiple values for the frequency dimension, such that the constellation mapper 862 might map some bits to one frequency subcarrier 821 and other bits to another frequency subcarrier 821. Other frequency subcarriers 821 may be reserved as guard bands, pilot tone subcarriers 821, or the like that do not (or do not always) carry data 854. For example, there may be one or more data subcarriers 821 and one or more pilot subcarriers 821. It should be noted that, in some instances or configurations, not all subcarriers 821 may be excited at once. For instance, some tones may not be excited to enable filtering. In one configuration, the base station 802 may utilize orthogonal frequency-division multiplexing (OFDM) for the transmission of multiple subcarriers 821. For instance, the constellation mapper 862 may map (encoded) data 854 to time and/or frequency resources according to the multiplexing scheme used.

The time dimension refers to symbol periods. Different bits may be allocated to different symbol periods. Where there are multiple streams 819, multiple subcarriers 821 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of streams 819 times the number of data subcarriers 821, divided by the length of the symbol period.

One or more wireless communication devices 804 may receive and use signals from the base station 802. For example, a wireless communication device 804 may use a received bandwidth indicator to receive a given number of OFDM tones or subcarriers 821. Additionally or alternatively, a wireless communication device 804 may use a pilot sequence generated by the base station 802 to characterize the channel, transmitter impairments and/or receiver impairments and use that characterization to improve receipt of data 854 encoded in the transmissions.

For example, a wireless communication device 804 may include one or more antennas 816a-n (which may be greater than, less than or equal to the number of base station 802 antennas 814*a-n* and/or the number of streams 819) that feed to one or more receiver radio-frequency (RX RF) blocks/modules 890. The one or more RX RF blocks/modules 890 may output analog signals to one or more analog-to-digital converters (ADCs) 892. For example, a receiver radio-frequency block 890 may receive and downconvert a signal, which may be provided to an analog-to-digital converter 892. As with the base station 802, the number of streams 819 processed may or may not be equal to the number of antennas 816*a-n*. Furthermore, each spatial stream 819 need not be limited to one antenna 814, as various beamsteering, orthogonalization, etc. techniques may be used to arrive at a plurality of receiver streams.

The one or more analog-to-digital converters (ADCs) 892 may convert the received analog signal(s) to one or more digital signal(s). The output(s) of the one or more analog-to-digital converters (ADCs) 892 may be provided to one or more time and/or frequency synchronization blocks/modules 894. A time and/or frequency synchronization block/module 894 may (attempt to) synchronize or align the digital signal in time and/or frequency (to a wireless communication device 804 clock, for example).

The (synchronized) output of the time and/or frequency synchronization block(s)/module(s) 894 may be provided to one or more deformatters 896. For example, a deformatter 896 may receive an output of the time and/or frequency synchronization block(s)/module(s) 894, remove guard intervals, etc. and/or parallelize the data for discrete Fourier transform (DFT) processing.

One or more deformatter 896 outputs may be provided to one or more discrete Fourier transform (DFT) blocks/modules 898. The discrete Fourier transform (DFT) blocks/modules 898 may convert one or more signals from the time domain to the frequency domain. A pilot processor 811 may use the frequency domain signals (per spatial stream 819, for example) to determine one or more pilot tones (over the streams 819, frequency subcarriers 821 and/or groups of symbol periods, for example) sent by the base station 802.

The pilot processor 811 may additionally or alternatively de-scramble the pilot sequence. The pilot processor 811 may use the one or more pilot sequences described herein for phase and/or frequency and/or amplitude tracking. The pilot tone(s) may be provided to a space-time-frequency detection and/or decoding block/module 813, which may detect and/or decode the data over the various dimensions. The space-time-frequency detection and/or decoding block/module 813 may output received data 815 (e.g., the access terminal's or wireless communication device's 804 estimation of the data 815 transmitted by the base station 802).

In some configurations, the wireless communication device 804 knows the transmit sequences sent as part of a total information sequence. The wireless communication device 804 may perform channel estimation with the aid of these known transmit sequences. To assist with pilot tone tracking, processing and/or data detection and decoding, a channel estimation block/module 822 may provide estimation signals to the pilot processor 811 and/or the space-time-frequency detection and/or decoding block/module 813 based on the output from the time and/or frequency synchronization block/module 894. Additionally or alternatively, the channel estimation block/module 822 may provide a channel estimate as data 817 to be transmitted to the base station 802. For example, the channel estimation block/module 822 may be employed in sending feedback (e.g., channel estimation reports) to the base station 802 via the one or more streams 819. Additionally or alternatively, if the de-formatting and discrete Fourier transform is the same for the known transmit sequences as for the payload data portion of the total information sequence, the estimation signals may be provided to the pilot processor 811 and/or the space-time-frequency detection and/or decoding block/module 813 based on the output from the discrete Fourier transform (DFT) blocks/modules 898.

In some configurations, the wireless communication device 804 may determine a channel bandwidth (for received communications). For example, the wireless communication device 804 may receive a bandwidth indication from the base station 802 that indicates a channel bandwidth. For instance, the wireless communication device 804 may obtain an explicit or implicit bandwidth indication. In one configuration, the bandwidth indication may indicate a channel bandwidth of 20 MHz, 40 MHz, 80 MHz or 160 MHz. The wireless communication device 804 may determine the bandwidth for received communications based on this indication and provide an indication of the determined bandwidth to the pilot processor 811 and/or to the space-time-frequency detection/decoding block/module 813.

The space-time frequency detection/decoding block/module 813 may use the determined bandwidth indication to detect and/or decode data from the received signal. In some configurations, the space-time-frequency detection/decoding block/module 813 may use a look-up table to determine the number of tones or subcarriers 821 to receive for a specified bandwidth.

In the configuration illustrated in FIG. 8, the wireless communication device 804 may include a transmitter 824. The transmitter 824 may perform similar operations as those performed by one or more of the elements 856, 858, 860, 862, 864, 870, 872, 874, 876, 878, 880, 884, 886 included in the base station 802 in order to transmit data 815 to the base station 802.

In the configuration illustrated in FIG. 8, the base station 802 may include a receiver 806 and a channel variation metric computation block/module 808. The receiver 806 of FIG. 8 may be one example of the receiver 106 described in connection with FIG. 1. In addition, the receiver 806 may perform similar operations as those performed by one or more of the elements 813, 811, 898, 896, 894, 892, 890, 822 included in the wireless communication device 804 in order to obtain received data from one or more wireless communication devices 804. Thus, as illustrated in FIG. 8, bi-directional communications between the base station 802 and the wireless communication device 804 may occur on one or more streams 819 and on one or more subcarriers 821. The channel variation metric computation block/module 808 may operate in accordance to the channel variation metric computation block/module 108 described in connection with FIG. 1.

Figure 9:
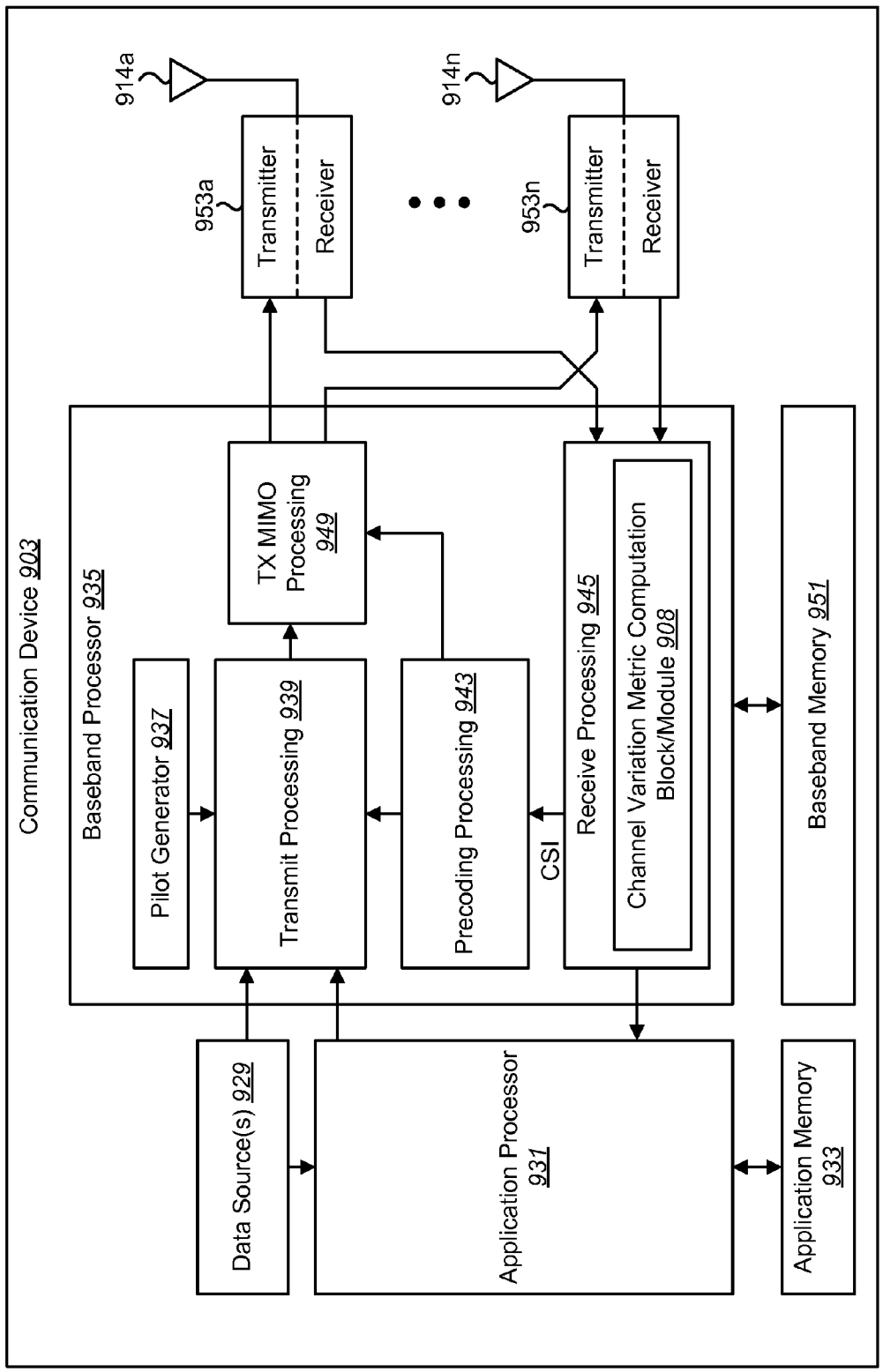
FIG. 9 is a block diagram of a communication device that may be used in a multiple-input and multiple-output (MIMO) system.

FIG. 9 is a block diagram of a communication device 903 that may be used in a multiple-input and multiple-output (MIMO) system. Examples of the communication device 903 may include base station 102, wireless communication devices 104, access point 402, first client 404*a*, second client 404*b*, base station 502, first wireless communication device 504*a*, second wireless communication device 504*b*, base station 802, wireless communication device 804, base stations, user equipment (UEs), etc. In the communication device 903, traffic data for a number of data streams is provided from one or more data sources 929 and/or an application processor 931 to a baseband processor 935. In particular, traffic data may be provided to a transmit processing block/module 939 included in the baseband processor 935. Each data stream may then be transmitted over a respective transmit antenna 914*a-n*. The transmit processing block/module 939 may format, code and interleave the traffic data for each data stream based on a particular coding scheme selected for that data stream to provide coded data.

The transmit processing block/module 939 may perform one or more of the methods 200, 300, 600 illustrated in FIGS. 2, 3 and 6. For example, the transmit processing block/module 939 process a feedback request at a base station 102, as described above.

The coded data for each data stream may be multiplexed with pilot data from a pilot generator 937 using orthogonal frequency-division multiplexing (OFDM) techniques. The pilot data may be a known data pattern that is processed in a known manner and used at a receiver to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK), quadrature amplitude modulation (QAM) or multi-level quadrature amplitude modulation (M-QAM)) selected for that data stream to provide modulation symbols. The data rate, coding and modulation for each data stream may be determined by instructions performed by a processor (e.g., baseband processor 935, application processor 931, etc.).

The modulation symbols for all data streams may be provided to a transmit (TX) multiple-input multiple-output (MIMO) processing block/module 949, which may further process the modulation symbols (e.g., for OFDM). The transmit (TX) multiple-input multiple-output (MIMO) processing block/module 949 then provides a number of modulation symbol streams to the transmitters 953*a-n*. The transmit (TX) multiple-input multiple-output (MIMO) processing block/module 949 may apply beamforming weights to the symbols of the data streams and to the antenna 914 from which the symbol is being transmitted.

Each transmitter 953 may receive and process a respective symbol stream to provide one or more analog signals, and further condition (e.g., amplify, filter, and upconvert) the analog signals to provide a modulated signal suitable for transmission over the MIMO channel. Modulated signals from the transmitters 953*a-n* are then respectively transmitted from the antennas 914*a-n*. For example, the modulated signal may be transmitted to another communication device (not illustrated in FIG. 9).

The communication device 903 may receive modulated signals (from another communication device). These modulated signals are received by antennas 914 and conditioned by receivers 953 (e.g., filtered, amplified, downconverted, digitized). In other words, each receiver 953 may condition (e.g., filter, amplify, and downconvert) a respective received signal, digitize the conditioned signal to provide samples, and further process the samples to provide a corresponding "received" symbol stream.

A receive processing block/module 945 included in the baseband processor 935 then receives and processes the received symbol streams from the receivers 953 based on a particular receiver processing technique to provide a number of "detected" streams. The receive processing block/module 945 demodulates, deinterleaves and decodes each stream to recover the traffic data for the data stream.

The receive processing block/module 945 may perform the method 200, 300, 600 illustrated in FIGS. 2, 3 and 6. For example, the receive processing block/module 945 may include a channel variation metric computation block/module 908. The channel variation metric computation block/module 908 may determine a channel variation metric.

A precoding processing block/module 943 included in the baseband processor 935 may receive channel state information (CSI) from the receive processing block/module 945. The precoding processing block/module 943 then determines which pre-coding matrix to use for determining the beamforming weights and then processes the extracted message. It should be noted that the baseband processor 935 may store information on and retrieve information from baseband memory 951.

The traffic data recovered by the baseband processor 935 may be provided to the application processor 931. The application processor 931 may store information in and retrieve information from the application memory 933.

Figure 10:
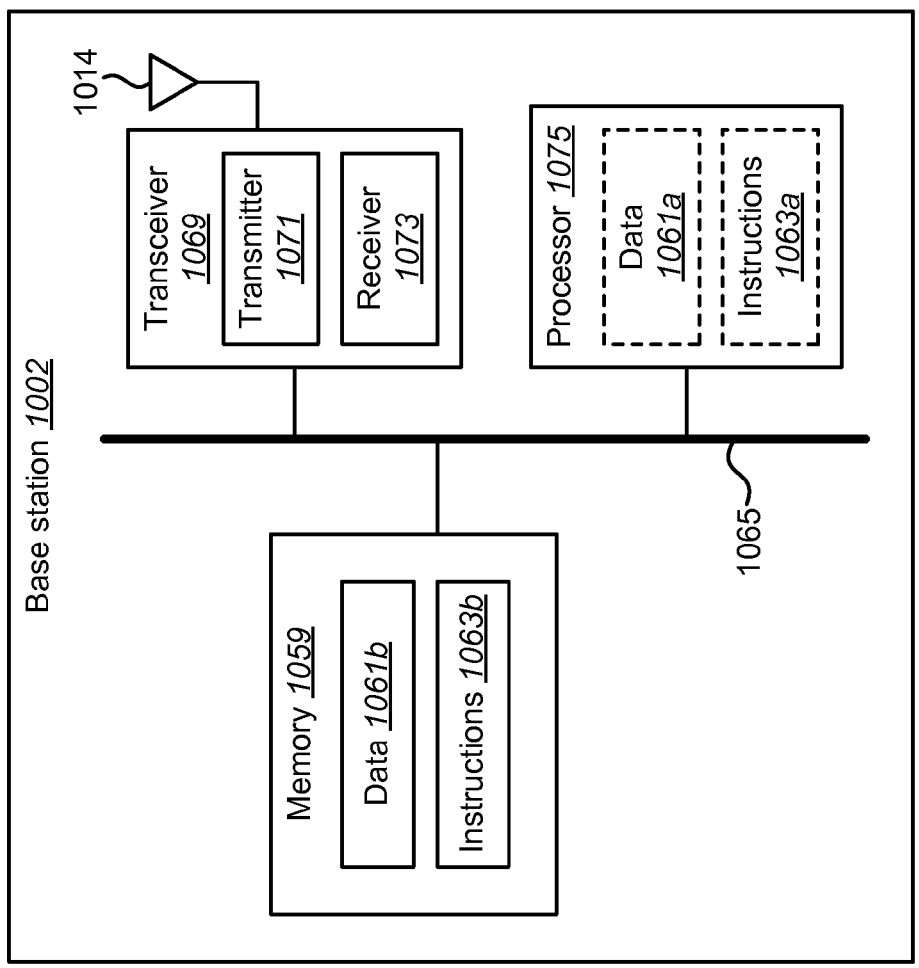
FIG. 10 illustrates certain components that may be included within a base station.

FIG. 10 illustrates certain components that may be included within a base station 1002. The base station 102, access point 402, base station 802 and communication device 903 described above may be configured similarly to the base station 1002 that is shown in FIG. 10. Examples of the base station 1002 may include base stations, access points, etc.

The base station 1002 includes a processor 1075. The processor 1075 may be a general purpose single- or multi-chip microprocessor (e.g., an ARM), a special purpose microprocessor (e.g., a digital signal processor (DSP)), a microcontroller, a programmable gate array, etc. The processor 1075 may be referred to as a central processing unit (CPU). Although just a single processor 1075 is shown in the base station 1002 of FIG. 10, in an alternative configuration, a combination of processors (e.g., an ARM and DSP) could be used.

The base station 1002 also includes memory 1059 in electronic communication with the processor 1075 (i.e., the processor 1075 can read information from and/or write information to the memory 1059). The memory 1059 may be any electronic component capable of storing electronic information. The memory 1059 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1061*b* and instructions 1063*b* may be stored in the memory 1059. The instructions 1063 may include one or more programs, routines, sub-routines, functions, procedures, code, etc. The instructions 1063 may include a single computer-readable statement or many computer-readable statements. The instructions 1063 may be executable by the processor 1075 to implement one or more of the methods 200, 300, 600 described above. Executing the instructions 1063 may involve the use of the data 1061 that is stored in the memory 1059. FIG. 10 shows some instructions 1063*a* and data 1061*a* being loaded into the processor 1075 (which may come from instructions 1063*b* and data 1061*b* in memory 1059).

The base station 1002 may also include a transmitter 1071 and a receiver 1073 to allow transmission and reception of signals between the base station 1002 and a remote location (e.g., another communication device, access terminal, access point, etc.). The transmitter 1071 and receiver 1073 may be collectively referred to as a transceiver 1069. An antenna 1014 may be electrically coupled to the transceiver 1069. The base station 1002 may also include (not shown) multiple transmitters, multiple receivers, multiple transceivers and/or multiple antenna.

The various components of the base station 1002 may be coupled together by one or more buses, which may include a power bus, a control signal bus, a status signal bus, a data bus, etc. For simplicity, the various buses are illustrated in FIG. 10 as a bus system 1065.

Figure 11:
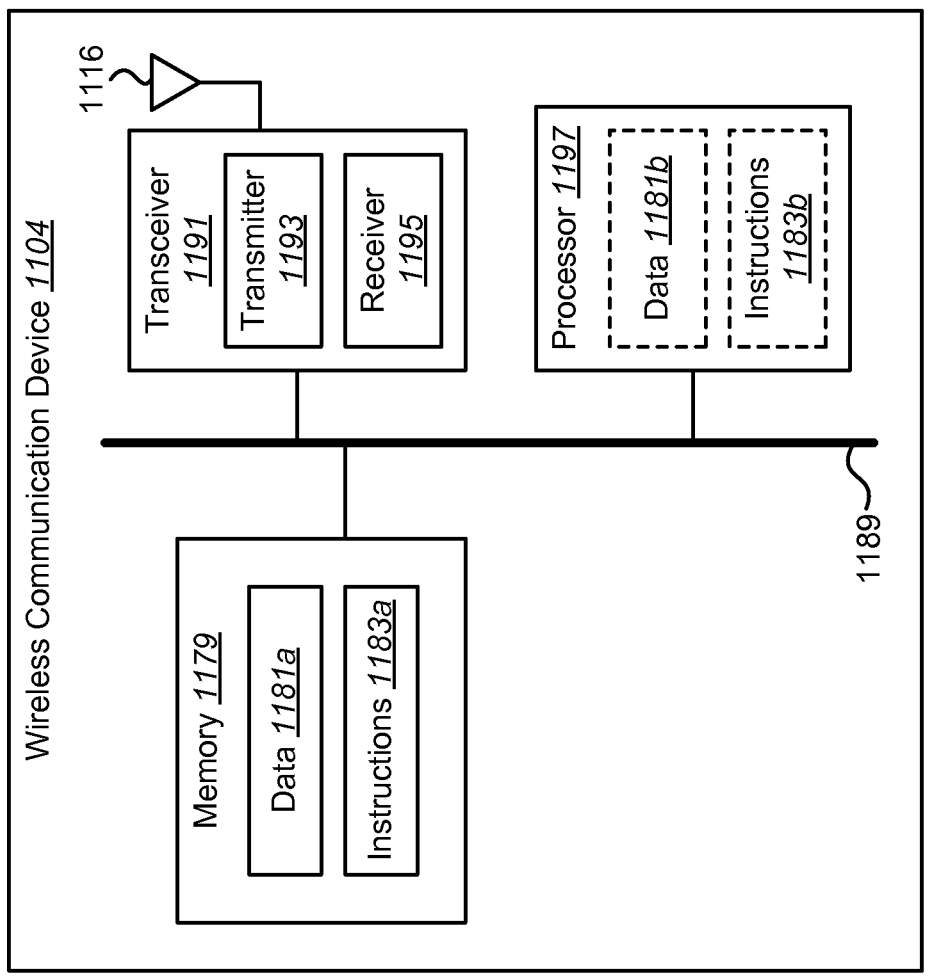
FIG. 11 illustrates certain components that may be included within a wireless communication device.

FIG. 11 illustrates certain components that may be included within a wireless communication device 1104. One or more of the wireless communication devices 104, first client 404a, second client 404b, first wireless communication device 504a, second wireless communication device 504b, wireless communication device 804, communication device 903 described above may be configured similarly to the wireless communication device 1104 that is shown in FIG. 11.

The wireless communication device 1104 includes a processor 1197. The processor 1197 may be a general purpose single- or multi-chip microprocessor (e.g., an ARM), a special purpose microprocessor (e.g., a digital signal processor (DSP)), a microcontroller, a programmable gate array, etc. The processor 1197 may be referred to as a central processing unit (CPU). Although just a single processor 1197 is shown in the wireless communication device 1104 of FIG. 11, in an alternative configuration, a combination of processors 1197 (e.g., an ARM and DSP) could be used.

The wireless communication device 1104 also includes memory 1179 in electronic communication with the processor 1197 (i.e., the processor 1197 can read information from and/or write information to the memory 1179). The memory 1179 may be any electronic component capable of storing electronic information. The memory 1179 may be random access memory (RAM), read-only memory (ROM), magnetic disk storage media, optical storage media, flash memory devices in RAM, on-board memory included with the processor 1197, programmable read-only memory (PROM), erasable programmable read-only memory (EPROM), electrically erasable PROM (EEPROM), registers, and so forth, including combinations thereof.

Data 1181a and instructions 1183a may be stored in the memory 1179. The instructions 1183a may include one or more programs, routines, sub-routines, functions, procedures, code, etc. The instructions 1183a may include a single computer-readable statement or many computer-readable statements. The instructions 1183a may be executable by the processor 1197 to implement one or more of the methods 200, 300, 600 described above. Executing the instructions 1183a may involve the use of the data 1181a that is stored in the memory 1179. FIG. 11 shows some instructions 1183b and data 1181b being loaded into the processor 1197 (which may come from instructions 1183a and data 1181a in memory 1179).

The wireless communication device 1104 may also include a transmitter 1193 and a receiver 1195 to allow transmission and reception of signals between the wireless communication device 1104 and a remote location (e.g., another electronic device, communication device, etc.). The transmitter 1193 and receiver 1195 may be collectively referred to as a transceiver 1191. An antenna 1116 may be electrically coupled to the transceiver 1191. The wireless communication device 1104 may also include (not shown) multiple transmitters 1193, multiple receivers 1195, multiple transceivers 1191 and/or multiple antenna 1116.

The various components of the wireless communication device 1104 may be coupled together by one or more buses, which may include a power bus, a control signal bus, a status signal bus, a data bus, etc. For simplicity, the various buses are illustrated in FIG. 11 as a bus system 1189.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for determining a channel variation metric by an electronic device, comprising:
   receiving a first packet;
   receiving a second packet;

determining a channel variation metric that approximates a mean square error value based on a first channel estimate corresponding to a first packet and a second channel estimate corresponding to a second packet; and performing an operation based on the channel variation metric, the operation comprising switching between a single-user multiple input and multiple output (SU-MIMO) mode and a multi-user multiple input and multiple output (MU-MIMO) mode.

2. The method of claim 1, wherein the channel variation metric is insensitive to gain variation and phase variation.

3. The method of claim 1, wherein performing an operation further comprises switching to an open loop mode.

4. The method of claim 1, wherein performing an operation comprises requesting feedback.

5. The method of claim 4, wherein requesting feedback occurs when the channel variation metric is less than a threshold.

6. The method of claim 1, wherein performing an operation comprises sending a multi-user multiple input and multiple output (MU-MIMO) packet without requesting feedback.

7. The method of claim 1, wherein performing an operation comprises determining a maximum time between feedback requests for at least one of the multi-user multiple input and multiple output (MU-MIMO) mode and the single-user multiple input and multiple output (SU-MIMO) mode.

8. The method of claim 1, wherein determining the channel variation metric comprises:
    determining absolute values of channel measurements corresponding to the first packet and to the second packet;
    determining a mean amplitude per antenna;
    determining normalized values based on the mean amplitude per antenna; and
    subtracting the normalized values.

9. The method of claim 1, wherein determining the channel variation metric is based on a subset of tones.

10. A communication device for determining a channel variation metric, comprising:
    receiver circuitry that receives a first packet and receives a second packet;
    channel variation metric computation circuitry coupled to the receiver circuitry, wherein the channel variation metric computation circuitry determines a channel variation metric that approximates a mean square error value based on a first channel estimate corresponding to a first packet and a second channel estimate corresponding to a second packet; and
    operations circuitry coupled to the channel variation metric computation circuitry, wherein the operations circuitry performs an operation based on the channel variation metric, the operation comprising switching between a single-user multiple input and multiple output (SU-MIMO) mode and a multi-user multiple input and multiple output (MU-MIMO) mode.

11. The communication device of claim 10, wherein the channel variation metric is insensitive to gain variation and phase variation.

12. The communication device of claim 10, wherein performing an operation further comprises switching to an open loop mode.

13. The communication device of claim 10, wherein performing an operation comprises requesting feedback.

14. The communication device of claim 13, wherein requesting feedback occurs when the channel variation metric is less than a threshold.

15. The communication device of claim 10, wherein performing an operation comprises sending a multi-user multiple input and multiple output (MU-MIMO) packet without requesting feedback.

16. The communication device of claim 10, wherein performing an operation comprises determining a maximum time between feedback requests for at least one of the multi-user multiple input and multiple output (MU-MIMO) mode and the single-user multiple input and multiple output (SU-MIMO) mode.

17. The communication device of claim 10, wherein determining the channel variation metric comprises:
    determining absolute values of channel measurements corresponding to the first packet and to the second packet;
    determining a mean amplitude per antenna;
    determining normalized values based on the mean amplitude per antenna; and
    subtracting the normalized values.

18. The communication device of claim 10, wherein determining the channel variation metric is based on a subset of tones.

19. A computer-program product for determining a channel variation metric, comprising a non-transitory tangible computer-readable medium having instructions thereon, the instructions comprising:
    code for causing a communication device to receive a first packet;
    code for causing the communication device to receive a second packet;
    code for causing the communication device to determine a channel variation metric that approximates a mean square error value based on a first channel estimate corresponding to a first packet and a second channel estimate corresponding to a second packet; and
    code for causing the communication device to perform an operation based on the channel variation metric, the operation comprising switching between a single-user multiple input and multiple output (SU-MIMO) mode and a multi-user multiple input and multiple output (MU-MIMO) mode.

20. The computer-program product of claim 19, wherein the channel variation metric is insensitive to gain variation and phase variation.

21. The computer-program product of claim 19, wherein code for causing the communication device to perform an operation further comprises code for causing the communication device to switch to an open loop mode.

22. The computer-program product of claim 19, wherein code for causing the communication device to perform an operation comprises code for causing the communication device to request feedback.

23. The computer-program product of claim 22, wherein requesting feedback occurs when the channel variation metric is less than a threshold.

24. The computer-program product of claim 19, wherein performing an operation comprises sending a multi-user multiple input and multiple output (MU-MIMO) packet without requesting feedback.

25. The computer-program product of claim 19, wherein code for causing the communication device to perform comprises code for causing the communication device to determine a maximum time between feedback requests for at least one of the multi-user multiple input and multiple output (MU-MIMO) mode and the single-user multiple input and multiple output (SU-MIMO) mode.

26. The computer-program product of claim 19, wherein code for causing the communication device to determine the channel variation metric comprises:
- code for causing the communication device to determine absolute values of channel measurements corresponding to the first packet and to the second packet;
- code for causing the communication device to determine a mean amplitude per antenna;
- code for causing the communication device to determine normalized values based on the mean amplitude per antenna; and
- code for causing the communication device to subtract the normalized values.

27. The computer-program product of claim 19, wherein code for causing the communication device to determine the channel variation metric is based on a subset of tones.

28. An apparatus for determining a channel variation metric, comprising:
- means for receiving a first packet;
- means for receiving a second packet;
- means for determining a channel variation metric that approximates a mean square error value based on a first channel estimate corresponding to a first packet and a second channel estimate corresponding to a second packet; and
- means for performing an operation based on the channel variation metric, the operation comprising switching between a single-user multiple input and multiple output (SU-MIMO) mode and a multi-user multiple input and multiple output (MU-MIMO) mode.

29. The apparatus of claim 28, wherein the channel variation metric is insensitive to gain variation and phase variation.

30. The apparatus of claim 28, wherein the means for performing an operation further comprises means for switching to an open loop mode.

31. The apparatus of claim 28, wherein means for performing an operation comprises means for requesting feedback.

32. The apparatus of claim 31, wherein requesting feedback occurs when the channel variation metric is less than a threshold.

33. The apparatus of claim 28, wherein means for performing an operation comprises means for sending a multi-user multiple input and multiple output (MU-MIMO) packet without requesting feedback.

34. The apparatus of claim 28, wherein the means for performing an operation comprises means for determining a maximum time between feedback requests for at least one of the multi-user multiple input and multiple output (MU-MIMO) mode and the single-user multiple input and multiple output (SU-MIMO) mode.

35. The apparatus of claim 28, wherein means for determining the channel variation metric comprises:
- means for determining absolute values of channel measurements corresponding to the first packet and to the second packet;
- means for determining a mean amplitude per antenna;
- means for determining normalized values based on the mean amplitude per antenna; and
- means for subtracting the normalized values.

36. The apparatus of claim 28, wherein means for determining the channel variation metric is based on a subset of tones.

\* \* \* \* \*